(12) United States Patent
Kadiri et al.

(10) Patent No.: US 11,012,929 B2
(45) Date of Patent: May 18, 2021

(54) TECHNIQUES FOR DETERMINING PUBLIC LAND MOBILE NETWORK SUPPORT OF DIFFERENT CORE NETWORKS

(71) Applicant: QUALCOMM Incorporated, San Diego, CA (US)

(72) Inventors: Prasad Reddy Kadiri, San Diego, CA (US); Ozcan Ozturk, San Diego, CA (US); Gavin Bernard Horn, La Jolla, CA (US); Masato Kitazoe, Hachiouji (JP); Lenaig Genevieve Chaponniere, La Jolla, CA (US); Haris Zisimopoulos, London (GB); Stefano Faccin, San Ysidro, CA (US); Hong Cheng, Bridgewater, NJ (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/031,961

(22) Filed: Jul. 10, 2018

(65) Prior Publication Data
US 2019/0021048 A1 Jan. 17, 2019

(30) Foreign Application Priority Data

Jul. 13, 2017 (GR) .............................. 20170100324

(51) Int. Cl.
*H04W 48/18* (2009.01)
*H04W 76/18* (2018.01)
(Continued)

(52) U.S. Cl.
CPC .......... *H04W 48/18* (2013.01); *H04W 16/14* (2013.01); *H04W 48/02* (2013.01); *H04W 48/12* (2013.01);
(Continued)

(58) Field of Classification Search
None
See application file for complete search history.

(56) References Cited

U.S. PATENT DOCUMENTS

2006/0183502 A1 8/2006 Jeong et al.
2012/0163293 A1 6/2012 Mildh et al.
(Continued)

FOREIGN PATENT DOCUMENTS

EP 3340692 A1 6/2018
WO WO-2017045189 A1 3/2017

OTHER PUBLICATIONS

International Search Report and Written Opinion—PCT/US2018/041655—ISA/EPO—dated Sep. 27, 2018 (175157WO).
(Continued)

*Primary Examiner* — Anh Vu H Ly
(74) *Attorney, Agent, or Firm* — Holland & Hart LLP

(57) ABSTRACT

Methods, systems, and devices for wireless communication are described that provide for identification, on a per-PLMN basis of a type of core network associated with each PLMN in a list of networks associated with a base station. A user equipment (UE) may receive the list of networks and, based at least in part on the type(s) of core network accessible via each PLMN and a capability of the UE, initiate a connection establishment with a PLMN and associated core network. In some cases, UEs that are not capable of connections with a first type of core network (e.g., a 5G core network) may be restricted from camping on a cell or PLMN that may provide only connections with the first type of core network (e.g., a 4G core network).

29 Claims, 16 Drawing Sheets

(51) Int. Cl.
*H04W 76/11* (2018.01)
*H04W 16/14* (2009.01)
*H04W 48/02* (2009.01)
*H04W 48/12* (2009.01)
*H04W 88/12* (2009.01)

(52) U.S. Cl.
CPC ............ *H04W 76/11* (2018.02); *H04W 76/18* (2018.02); *H04W 88/12* (2013.01)

(56) References Cited

U.S. PATENT DOCUMENTS

| | | | | |
|---|---|---|---|---|
| 2017/0374695 | A1* | 12/2017 | Lau ...................... | H04W 76/11 |
| | | | | 370/328 |
| 2019/0014515 | A1* | 1/2019 | Zee ...................... | H04W 36/08 |
| | | | | 370/328 |
| 2019/0045351 | A1* | 2/2019 | Zee ...................... | H04W 8/06 |
| | | | | 370/328 |
| 2019/0357125 | A1* | 11/2019 | Mildh .................. | H04W 48/16 |

OTHER PUBLICATIONS

"Universal Mobile Telecommunications System (UMTS); LTE; Network Sharing; Architecture and Functional Description (3GPP TS 23.251 version 9.2.0 Release 9)", Technical Specification, European Telecommunications Standards Institute (ETSI), 650, Route Des Lucioles; F-06921 Sophia-Antipolis ; France, vol. 3GPP SA 2, No. V9.2.0, Mar. 1, 2010 (Mar. 1, 2010), XP014046433, 22 pages.

* cited by examiner

TECHNIQUES FOR DETERMINING PUBLIC LAND MOBILE NETWORK SUPPORT OF DIFFERENT CORE NETWORKS

CROSS REFERENCES

The present Application for Patent claims priority to Greek Patent Application No. 20170100324 by Kadiri et al., entitled "Techniques For Determining Public Land Mobile Network Support of Different Core Networks," filed Jul. 13, 2017, assigned to the assignee hereof.

INTRODUCTION

The following relates generally to wireless communication, and more specifically to techniques for determining public land mobile network support of different core networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system or a New Radio (NR) system). A wireless multiple-access communications system may include a number of base stations or access network nodes, each simultaneously supporting communication for multiple communication devices, which may be otherwise known as user equipment (UE).

Wireless communications systems may evolve such that different formats, protocols, radio access technologies (RATs), and the like, change over time. Thus, wireless communications systems may be heterogeneous in that some devices may be configured for legacy operations using relatively older formats, protocols, RATs, and the like, and other devices may be configured for advanced operations using relatively newer formats, protocols, RATs, and the like. Coexistence of such devices within a same wireless communication system that may allow different types of devices to connect through one or more common base stations or access network nodes may help to enhance network access and efficiency.

SUMMARY

A method of wireless communication is described. The method may include receiving, from a base station, one or more information elements (IEs) indicating a list of networks that are available via the base station, determining a type of core network associated with each network in the list of networks, based at least in part on whether each network served by the base station is capable of providing access to a first type of core network or to both the first type of core network and a second type of core network, and initiating a connection establishment to the first type of core network via a first network of the list of networks based at least in part on determining that the first network is capable of providing access to the first type of core network.

An apparatus for wireless communication is described. The apparatus may include means for receiving, from a base station, one or more IEs indicating a list of networks that are available via the base station, means for determining a type of core network associated with each network in the list of networks, based at least in part on whether each network served by the base station is capable of providing access to a first type of core network or to both the first type of core network and a second type of core network, and means for initiating a connection establishment to the first type of core network via a first network of the list of networks based at least in part on determining that the first network is capable of providing access to the first type of core network.

Another apparatus for wireless communication is described. The apparatus may include a processor, memory in electronic communication with the processor, and instructions stored in the memory. The instructions may be operable to cause the processor to receive, from a base station, one or more IEs indicating a list of networks that are available via the base station, determine a type of core network associated with each network in the list of networks, based at least in part on whether each network served by the base station is capable of providing access to a first type of core network or to both the first type of core network and a second type of core network, and initiate a connection establishment to the first type of core network via a first network of the list of networks based at least in part on determining that the first network is capable of providing access to the first type of core network.

A non-transitory computer readable medium for wireless communication is described. The non-transitory computer-readable medium may include instructions operable to cause a processor to receive, from a base station, one or more IEs indicating a list of networks that are available via the base station, determine a type of core network associated with each network in the list of networks, based at least in part on whether each network served by the base station is capable of providing access to a first type of core network or to both the first type of core network and a second type of core network, and initiate a connection establishment to the first type of core network via a first network of the list of networks based at least in part on determining that the first network is capable of providing access to the first type of core network.

In some examples of the method, apparatus, and non-transitory computer-readable medium described above, the list of networks comprises a list of public land mobile network (PLMN) identifications (IDs), and the receiving comprises receiving, for a plurality of PLMNs served by the base station, a per-PLMN IE that indicates that an associated PLMN can provide access to the second type of core network or that the associated PLMN can provide access to both the first type of core network and the second type of core network.

In some examples of the method, apparatus, and non-transitory computer-readable medium described above, the initiating comprises formatting an access stratum (AS) indication that indicates the first type of core network, and transmitting the AS indication to the base station.

Some examples of the method, apparatus, and non-transitory computer-readable medium described above may further include processes, features, means, or instructions for initiating a connection establishment to the second type of core network based at least in part on determining that each network of the list of networks may be incapable of providing access to the first type of core network. In some examples of the method, apparatus, and non-transitory computer-readable medium described above, the receiving includes receiving the list of networks in a first IE that indicates one or more public land mobile networks (PLMNs)

that is capable of providing access only to the first type of core network. In some examples of the method, apparatus, and non-transitory computer-readable medium described above, the receiving further includes receiving a second IE that indicates one or more other PLMNs that are capable of providing access to the first type of core network or both the first type of core network and the second type of core network, wherein the first IE may be recognizable by a first type of UE capable of accessing the first type of core network, and the second IE may be recognizable by the first type of UE and a second type of UE that may be incapable of accessing the first type of core network.

In some examples of the method, apparatus, and non-transitory computer-readable medium described above, a first IE indicates that a first type of UE is not barred from accessing the base station, the first type of UE being capable of accessing the first type of core network. In some examples of the method, apparatus, and non-transitory computer-readable medium described above, a second IE recognizable by a second type of UE indicates that UEs are barred from accessing the base station, the second type of UE being incapable of accessing the first type of core network and being incapable of recognizing the first IE. In some examples of the method, apparatus, and non-transitory computer-readable medium described above, the first type of UE ignores the second IE.

In some examples of the method, apparatus, and non-transitory computer-readable medium described above, the receiving further includes receiving an indication in the first IE, on a per-network basis, of one or more networks served by the base station that are capable of providing access to the first type of core network.

In some examples of the method, apparatus, and non-transitory computer-readable medium described above, a first type of UE that is capable of accessing the first type of core network may have a first access class that is different than a second access class of second type of UE that is incapable of accessing the first type of core network. In some examples of the method, apparatus, and non-transitory computer-readable medium described above, the one or more IEs indicate which networks of the list of networks are accessible to one or more UEs of the first access class.

In some examples of the method, apparatus, and non-transitory computer-readable medium described above, the first type of UE is configured with both the first access class and the second access class, and uses the first access class for access to the first type of core network and uses the second access class for access to the second type of core network. In some examples of the method, apparatus, and non-transitory computer-readable medium described above, a first IE recognizable by the first type of UE indicates that UEs of the first access class is not barred from accessing the base station. In some examples of the method, apparatus, and non-transitory computer-readable medium described above, a second IE recognizable by a second type of UE indicates that UEs are barred from accessing the base station, the second type of UE being incapable of recognizing the first IE.

In some examples of the method, apparatus, and non-transitory computer-readable medium described above, the receiving further includes receiving a closed subscriber group (CSG) identification that indicates that the base station is closed to UEs that are incapable of accessing the first type of core network. In some examples of the method, apparatus, and non-transitory computer-readable medium described above, a first type of UE that is capable of accessing the first type of core network may be configured with a CSG access identification that corresponds to the CSG identification.

A method of wireless communication is described. The method may include transmitting to a UE, by a base station, one or more IEs that indicate a list of networks that are available via the base station, wherein the one or more IEs are recognizable by a first type of UE that is capable of accessing a first type of core network, and wherein one or more of the IEs indicate whether each of the networks in the list of networks is capable of providing access to the first type of core network or both the first type of core network and a second type of core network and receiving a request from the UE to establish a connection with the first type of core network via one of the networks that is capable of providing access to the first type of core network.

An apparatus for wireless communication is described. The apparatus may include means for transmitting to a UE, by a base station, one or more IEs that indicate a list of networks that are available via the base station, wherein the one or more IEs are recognizable by a first type of UE that is capable of accessing a first type of core network, and wherein one or more of the IEs indicate whether each of the networks in the list of networks is capable of providing access to the first type of core network or both the first type of core network and a second type of core network and means for receiving a request from the UE to establish a connection with the first type of core network via one of the networks that is capable of providing access to the first type of core network.

Another apparatus for wireless communication is described. The apparatus may include a processor, memory in electronic communication with the processor, and instructions stored in the memory. The instructions may be operable to cause the processor to transmit to a UE, by a base station, one or more IEs that indicate a list of networks that are available via the base station, wherein the one or more IEs are recognizable by a first type of UE that is capable of accessing a first type of core network, and wherein one or more of the IEs indicate whether each of the networks in the list of networks is capable of providing access to the first type of core network or both the first type of core network and a second type of core network and receive a request from the UE to establish a connection with the first type of core network via one of the networks that is capable of providing access to the first type of core network.

A non-transitory computer readable medium for wireless communication is described. The non-transitory computer-readable medium may include instructions operable to cause a processor to transmit to a UE, by a base station, one or more IEs that indicate a list of networks that are available via the base station, wherein the one or more IEs are recognizable by a first type of UE that is capable of accessing a first type of core network, and wherein one or more of the IEs indicate whether each of the networks in the list of networks is capable of providing access to the first type of core network or both the first type of core network and a second type of core network and receive a request from the UE to establish a connection with the first type of core network via one of the networks that is capable of providing access to the first type of core network.

In some examples of the method, apparatus, and non-transitory computer-readable medium described above, the list of networks comprises a list of public land mobile network (PLMN) IDs, and wherein the transmitting comprises transmitting, for a plurality of PLMNs served by the base station, a per-PLMN IE that indicates that an associated PLMN can provide access to the second type of core network or that the associated PLMN can provide access to both the first type of core network and the second type of core network. In some examples of the method, apparatus, and non-transitory computer-readable medium described above, the receiving comprises receiving an AS indication in a connection establishment request that indicates the first type of core network.

In some examples of the method, apparatus, and non-transitory computer-readable medium described above, the list of networks comprises a list of public land mobile network (PLMN) IDs, and wherein the transmitting comprises transmitting a PLMN list in the one or more IEs that indicates one or more PLMNs that are capable of providing access only to the first type of core network.

In some examples of the method, apparatus, and non-transitory computer-readable medium described above, the transmitting further comprises transmitting a second IE that indicates one or more other PLMNs that are capable of providing access to the first type of core network or both the first type of core network and the second type of core network, wherein the second IE is recognizable by the first type of UE and by a second type of UE that is incapable of accessing the first type of core network. In some examples of the method, apparatus, and non-transitory computer-readable medium described above, the one or more IEs indicate that the first type of UE is not barred from accessing the base station and wherein the transmitting further comprises transmitting a second IE recognizable by a second type of UE that indicates that UEs are barred from accessing the base station, the second type of UE being incapable of accessing the first type of core network.

In some examples of the method, apparatus, and non-transitory computer-readable medium described above, the transmitting further comprises transmitting, on a per-network basis, an indication that one or more of the networks served by the base station are capable of providing access to the first type of core network.

In some examples of the method, apparatus, and non-transitory computer-readable medium described above, the first type of UE may have a first access class that is different than a second access class of a second type of UE that is incapable of accessing the first type of core network. In some examples of the method, apparatus, and non-transitory computer-readable medium described above, the one or more IEs indicate which networks of the list of networks are accessible to one or more UEs of the first access class.

In some examples of the method, apparatus, and non-transitory computer-readable medium described above, the first type of UE is configured with both the first access class and the second access class, and uses the first access class for access to the first type of core network and uses the second access class for access to the second type of core network. In some examples of the method, apparatus, and non-transitory computer-readable medium described above, a first IE recognizable by the first type of UE indicates that UEs of the first access class are not barred from accessing the base station. In some examples of the method, apparatus, and non-transitory computer-readable medium described above, a second IE recognizable by the second type of UE indicates that UEs are barred from accessing the base station, the second type of UE being incapable of recognizing the first IE.

In some examples of the method, apparatus, and non-transitory computer-readable medium described above, receiving further includes receiving a second IE that indicates that the list of networks comprises a list of PLMN IDs that are capable of providing access to the second type of core network.

In some examples of the method, apparatus, and non-transitory computer-readable medium described above, determining the type of core network associated with each network is further based on one or more of the one or more IEs, a per PLMN based tracking area code indication for each core network type, an indication associated with a PLMN database, or, for each PLMN, a type of the list of networks that contains the PLMN.

Some examples of the method, apparatus, and non-transitory computer-readable medium described above may further include processes, features, means, or instructions for transmitting a CSG identification that indicates that the base station is closed to UEs that are incapable of accessing the first type of core network. In some examples of the method, apparatus, and non-transitory computer-readable medium described above, the first type of UE is configured with a CSG access identification that corresponds to the CSG identification.

DETAILED DESCRIPTION

Figure 1:
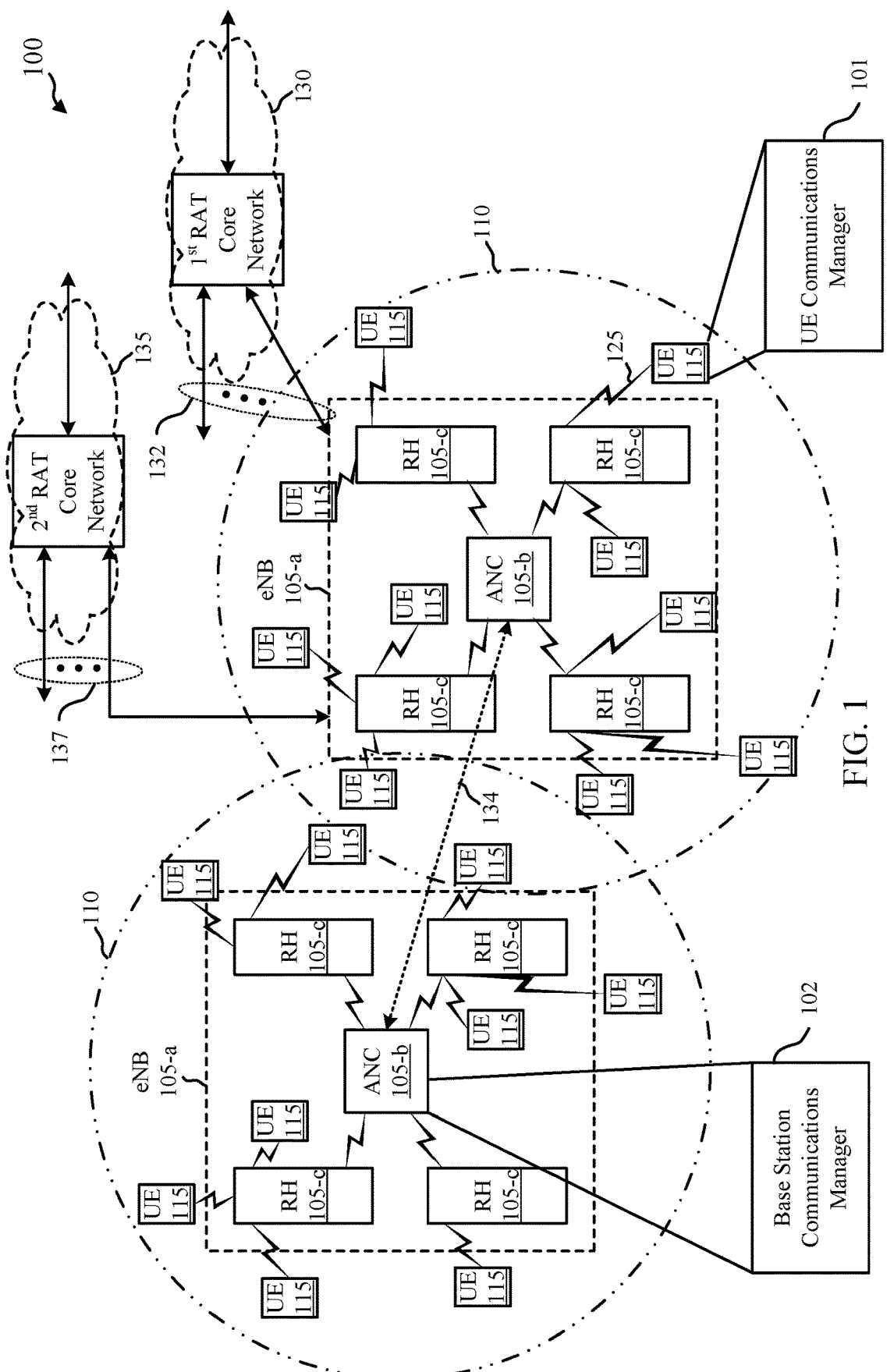
FIG. 1 illustrates an example of a system for wireless communication that supports techniques for determining public land mobile network support of different core networks in accordance with aspects of the present disclosure.

Various techniques described herein relate to improved methods, systems, devices, or apparatuses for determining public land mobile network (PLMN) support of different core networks. Generally, the described techniques provide for identification, on a per-PLMN basis of a type of core network associated with each PLMN in a list of networks associated with a base station. A user equipment (UE) may receive the list of networks and, based at least in part on the type(s) of core network accessible via each PLMN and a capability of the UE, initiate a connection establishment with a PLMN and associated core network. In some cases, UEs that are not capable of connections with a first type of core network (e.g., a 5G core network) may be restricted from camping on a cell or PLMN that may provide only connections with the first type of core network.

In some cases, connectivity to both 4G (e.g., LTE or eLTE networks) and 5G (e.g., NR networks) core networks (CNs) may be provided through common base stations that may support connectivity to one or both types of core networks through one or more PLMNs. In the present disclosure, base stations, PLMNs, and UEs that are able to connect and communicate only through 4G systems are referred to as legacy devices or legacy UEs. Devices or UEs that provide connectivity to 5G systems, either exclusively or in combination with access to 4G systems, are referred to as providing enhanced connectivity and may be referred to as eLTE devices or UEs. In some cases, legacy UEs may support the LTE evolved packet core (EPC) non-access stratum (NAS) but not 5GCN NAS. UEs that are eLTE capable may support both EPC NAS and 5GCN NAS, or 5GCN NAS only. Furthermore, legacy LTE systems may allow service for both legacy UEs and New eLTE UEs capable of both EPC NAS and 5GCN NAS. In such cases, a base station may broadcast multiple PLMNs in a system information block (SIB), such as in SIB1, that indicates radio access network (RAN) sharing across multiple PLMNs. For each PLMN, the SIB may indicate whether connectivity is provided for 5GCN only or 5GCN and EPC. In some examples, the core network connectivity type per PLMN can be specified either implicitly or explicitly based on using a PLMN database method or using a per PLMN based tracking area code (e.g., trackingAreaCode) for each core network type. The PLMN database method may include determining the core network connectivity type based on an indication associated with the PLMN database.

When a legacy UE camps on eLTE with EPC and 5GCN capability, the legacy UE will get service from the LTE EPC CN. When an eLTE UE camps on a cell that supports access to the 5GCN or both the 5GCN and EPC, the UE may provide an indication to the base station for a particular CN service. Based on the UE request, the base station may provide connectivity to requested CN. Because a legacy UE may identify a base station that provides connectivity to a 5GCN, such a UE may attempt to camp on a cell of the base station. In order to prevent such a legacy UE from trying to camp on a PLMN or a base station that does not provide access to the LTE EPC, various techniques are provided that may allow a UE to attempt access to a CN that corresponds to the UE capability. In some cases, a new information element (IE) may be provided that is recognizable only by eLTE capable UEs, and that may indicate 5GCN connectivity. In some cases, a closed subscriber group (CSG) may be provided that is associated with the 5GCN and where legacy UEs may not access PLMNs associated with the CSG.

Aspects of the disclosure are initially described in the context of a wireless communications system. Aspects of the disclosure are further illustrated by and described with reference to apparatus diagrams, system diagrams, and flowcharts that relate to techniques for determining public land mobile network support of different core networks.

FIG. 1 illustrates an example of a wireless communications system 100, in accordance with one or more aspects of the present disclosure. The wireless communications system 100 includes base stations 105 (e.g., gNBs 105-a including access node controller(s) (ANC (s)) 105-b, and/or radio heads (RHs) 105-c), UEs 115, a first RAT core network 130, and a second RAT core network 135. In some examples, the wireless communications system 100 may be a LTE, LTE-Advanced (LTE-A) network, a NR network, or may provide access to both a LTE and NR core network. In some cases, the wireless communications system 100 may support enhanced broadband communications, ultra-reliable (i.e., mission critical) communications, low latency communications, and communications with low-cost and low-complexity devices.

The base stations 105 may wirelessly communicate with the UEs 115 via one or more base station antennas. Each of the base stations 105 may provide communication coverage for a respective geographic coverage area 110. Communication links 125 shown in the wireless communications system 100 may include uplink transmissions from a UE 115 to a base station 105, or downlink transmissions from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

The UEs 115 may be dispersed throughout the wireless communications system 100, and each of the UEs 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of the UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

The base stations 105 may communicate with the first RAT core network 130, a second RAT core network 135, and with one another. For example, the base stations 105 may interface with the first RAT core network 130 through backhaul links 132 (e.g., S1, etc.), and may interface with the second RAT core network 135 through backhaul links 137 (e.g., S1, etc.). In some cases, the first RAT core network 130 may be a 5G network, and the second RAT core network 135 may be a 4G network. The base stations 105 may communicate with one another over backhaul links 134 (e.g., X2, etc.) either directly or indirectly (e.g., through a core network). The base stations 105 may perform radio configuration and scheduling for communication with UEs 115, or may operate under the control of a base station controller. In some examples, the base stations 105 may be macro cells, small cells, hot spots, or the like. The base stations 105 may also be referred to as evolved NodeBs (eNBs) 105.

A base station 105 may be connected by an S1 interface to each of the core network 130, 135. The core networks 130, 135 may provide mobility management, at least one serving gateway (S-GW), and at least one Packet Data Network (PDN) gateway (P-GW). All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core networks 130, 135 may provide user authentication, access authorization, tracking, IP connectivity, and other access, routing, or mobility functions. At least some of the network devices, such as the base station 105-a may include subcomponents such as an access network entity 105-b, which may be an example of an access node controller (ANC). Each access network entity 105-b may communicate with a number of the UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of the base stations 105 may include a base station communications manager 102, which may transmit one or more IEs (e.g., via SIB1) that indicate a list of networks (e.g., a PLMN list) that are available via the base station. In some cases, the one or more IEs are recognizable only by a first type of UE that is capable of accessing the first RAT core network 130, and may indicate whether each of the networks in the list of networks is capable of providing access to the first RAT core network 130 or to both the first RAT core network 130 and the second RAT core network 135. The base station communications manager 102 may receive a request from a UE 115 to establish a connection with the first RAT core network 130 via one of the networks (e.g., a PLMN on the PLMN list) that is capable of providing access to the first RAT core network 130. In some cases, the UEs 115 that are not capable of accessing the first RAT core network 130 may not recognize the one or more IEs associated with the first RAT core network 130. The base station communications manager 102 may be an example of a base station communications manager 1015 of FIG. 10, a base station communications manager 1115 of FIG. 11, a base station communications manager 1215 of FIG. 12, or a base station communications manager 1315 of FIG. 13.

The UEs 115 may include a UE communications manager 101, which may receive, from a base station 105, one or more IEs indicating a list of networks (e.g., a PLMN list) that are available via the base station 105. The UE communications manager 101 may determine a type of core network associated with each network in the list of networks, based at least in part on the one or more explicit IEs or an implicit mechanism and whether each network served by the base station 105 is capable of providing access to the first RAT core network 130 or to both the first RAT core network 130 and the second RAT core network 135. The UE communications manager 101 may, based at least in part on determining the type of core network associated with each network, initiate a connection establishment to the first RAT core network 130 via a first network of the list of networks. The UE communications manager 101 may be an example of a UE communications manager 615 of FIG. 6, a UE communications manager 715 of FIG. 7, a UE communications manager 815 of FIG. 8, or a UE communications manager 915 of FIG. 9.

In some cases, the wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, the network device 105-b, or the core network 130 supporting radio bearers for user plane data. At the Physical (PHY) layer, transport channels may be mapped to physical channels.

The wireless communications system 100 may support operation on multiple cells or carriers, a feature which may be referred to as carrier aggregation (CA) or multi-carrier operation. A carrier may also be referred to as a component carrier (CC), a layer, a channel, or the like. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, the wireless communications system 100 may utilize enhanced component carriers (eCCs). An eCC may be characterized by one or more features, as compared with a CC, including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide bandwidth may include one or more segments that may be utilized by the UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or a base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, the wireless communications system 100 may utilize both licensed and unlicensed radio frequency spectrum bands. For example, the wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as the base stations 105 and the UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD), or a combination of both.

Figure 2:
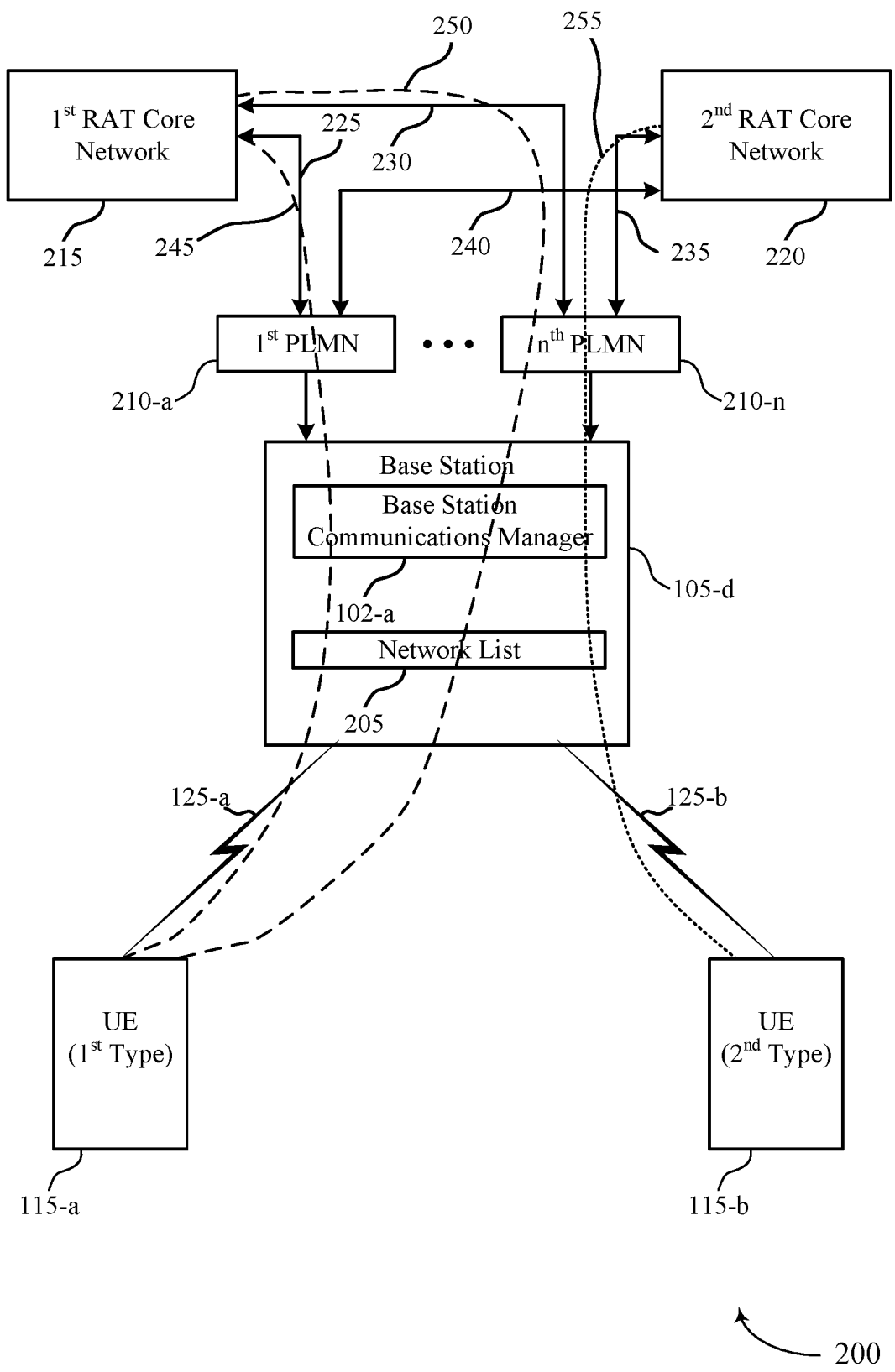
FIG. 2 illustrates an example of a portion of a wireless communications system that supports techniques for determining public land mobile network support of different core networks in accordance with aspects of the present disclosure.

FIG. 2 illustrates an example of a portion of a wireless communications system 200 that supports techniques for determining public land mobile network support of different core networks in accordance with various aspects of the present disclosure. In some examples, the wireless communications system 200 may implement aspects of the wireless communications system 100 of FIG. 1.

In the example of FIG. 2, two different types of UEs 115 may be present in the wireless communications system 200. A first type of UE 115-a may be capable of accessing, via a base station 105-d, a first RAT core network 215, but not a second RAT core network 220. For example, the first type of UE 115-a may be a legacy UE that is capable of accessing only a 4G EPC, and the first RAT core network 215 may be an LTE EPC and the second RAT core network 220 may be a 5GCN. A second type of UE 115-b may be capable of accessing both the first RAT core network 215 and the second RAT core network 220 via the base station 105-d and may be, for example, an eLTE UE. Each UE 115 may include a UE communications manager that may perform the functions such as discussed with the UE communications manager of FIG. 1, 6, 7, 8, or 9.

Figure 10:
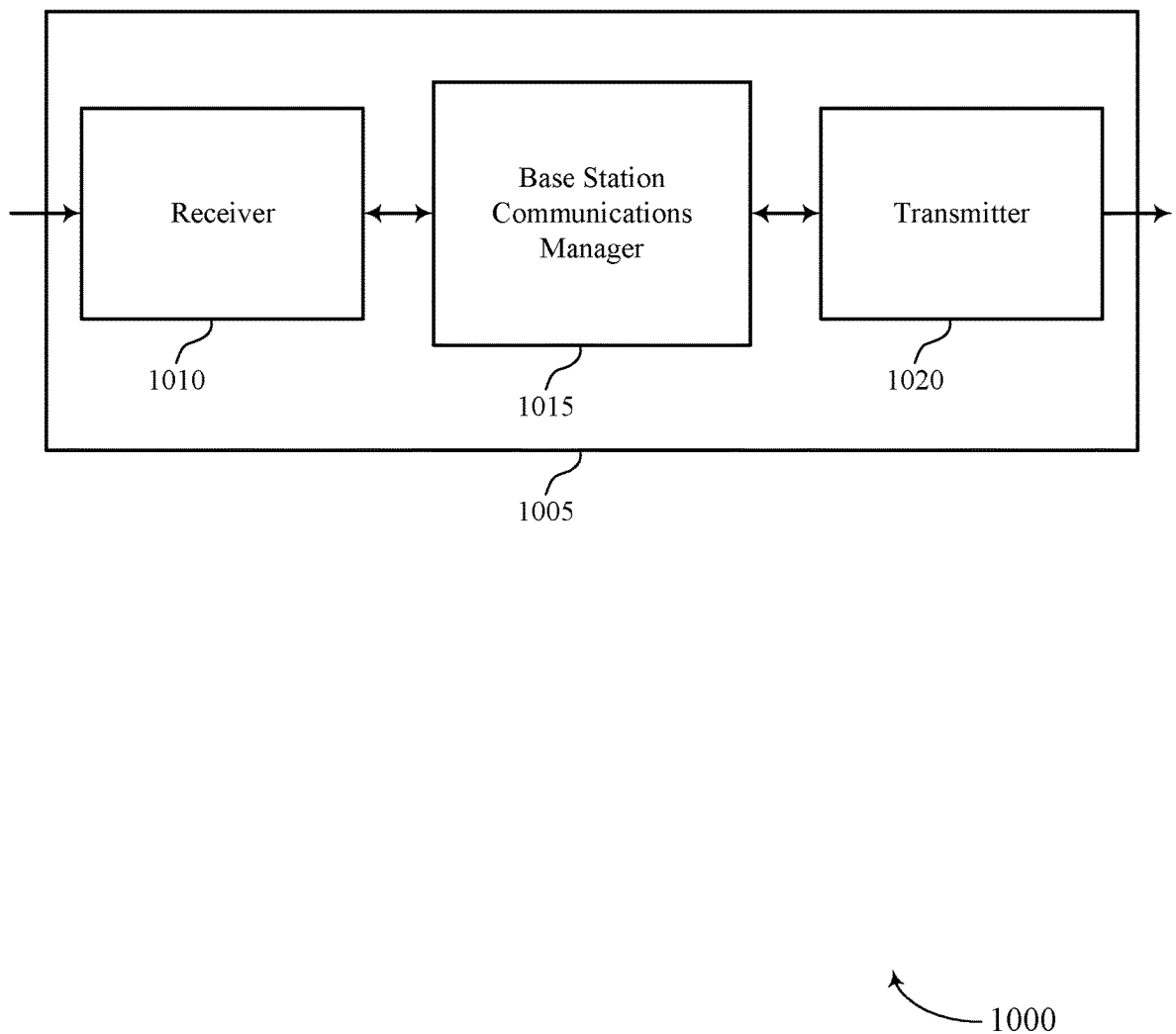
FIGS. 10 through 12 show block diagrams of a device that supports techniques for determining public land mobile network support of different core networks in accordance with aspects of the present disclosure.
Figure 11:
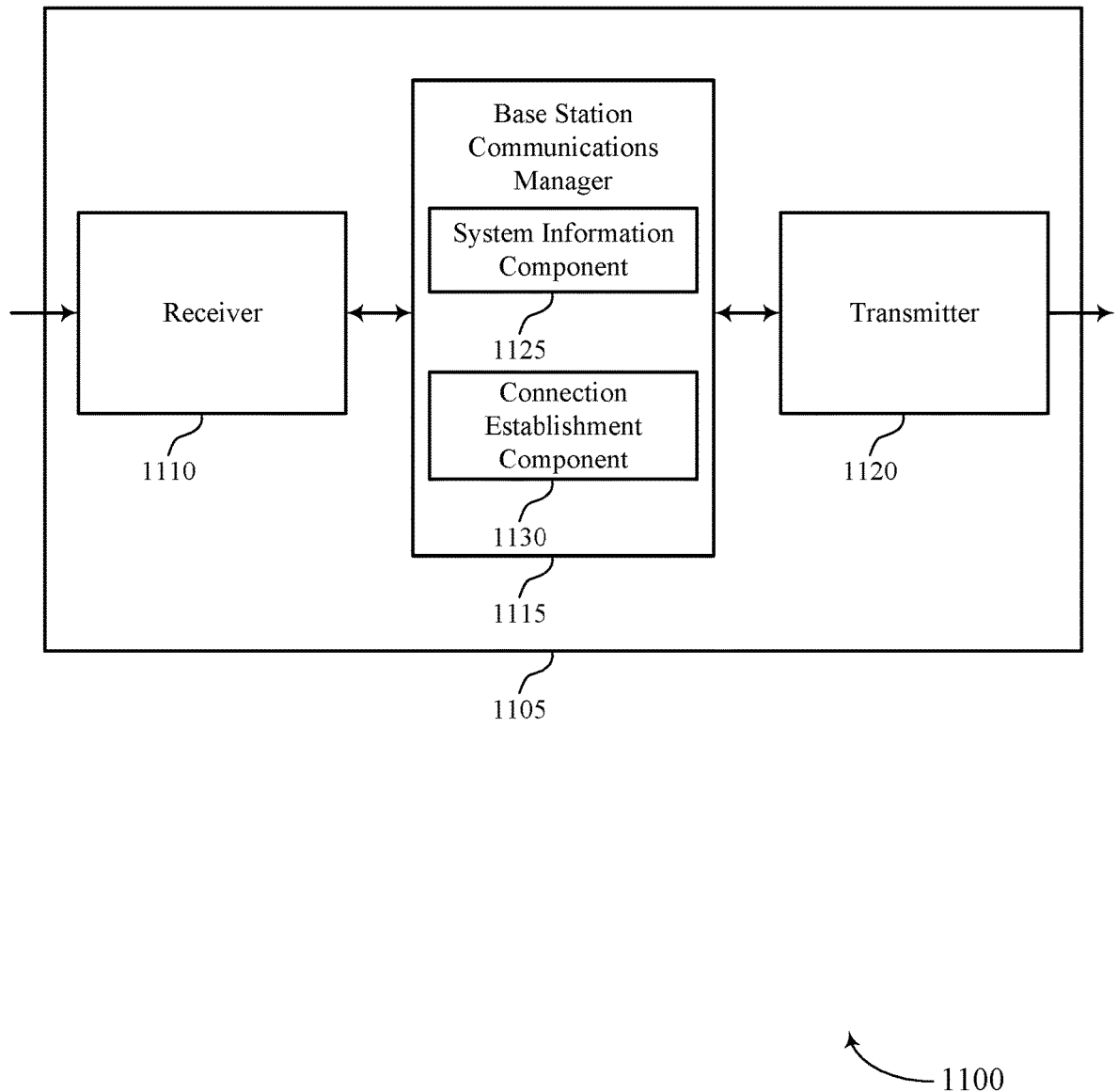
Figure 13:
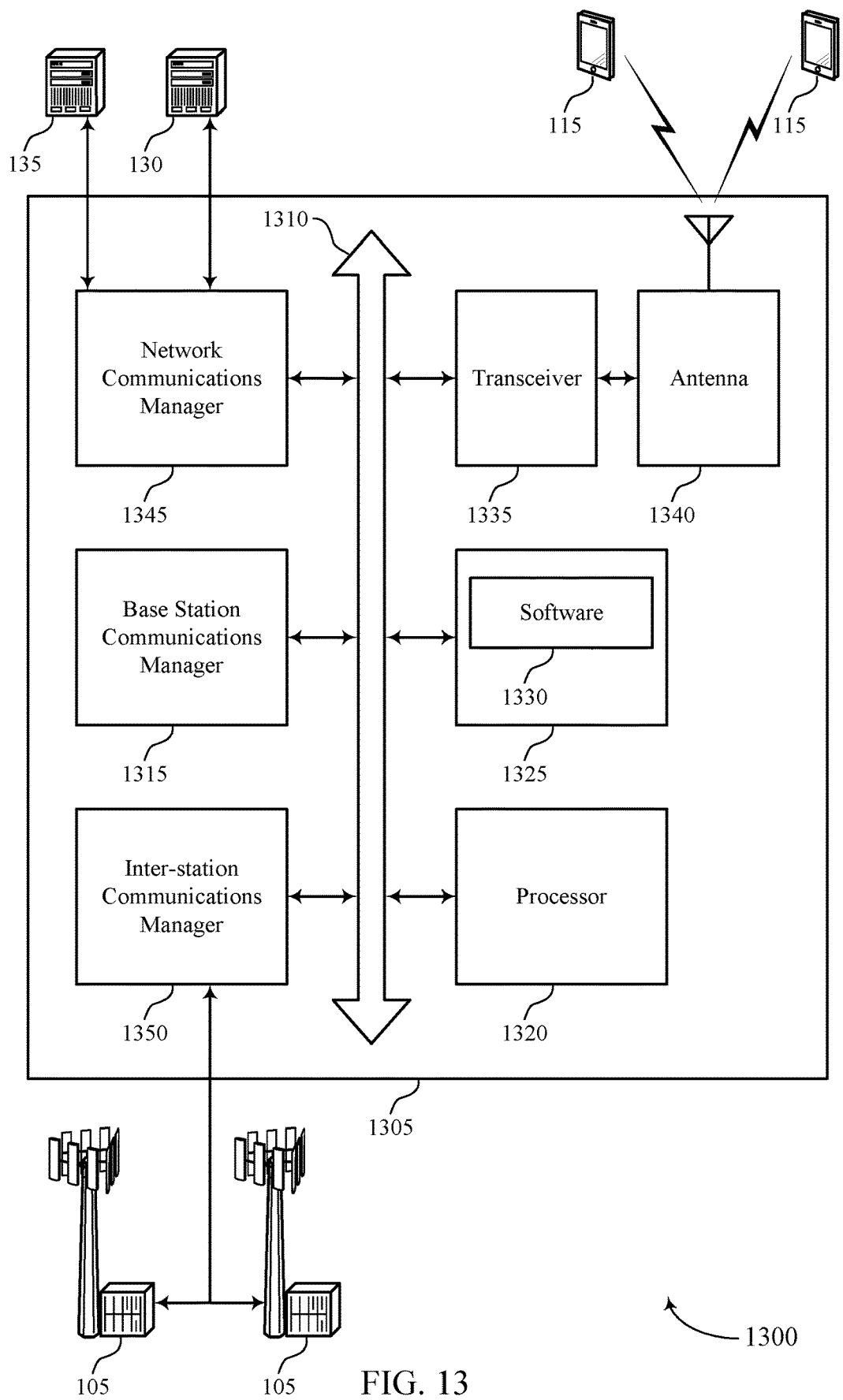
FIG. 13 illustrates a block diagram of a system including a base station that supports techniques for determining public land mobile network support of different core networks in accordance with aspects of the present disclosure.

The base station 105-d may include a base station communications manager 102-a, which may be an example of a base station communications manager 102 of FIG. 1, a base station communications manager 1015 of FIGS. 10 and 11, or a base station communications manager 1315 of FIG. 13. The base station 105-d may also include a network list 205, such as a PLMN list. The base station 105-d may provide the network list 205 to the UEs 115 in one or more IEs (e.g., in a SIB1 transmission). The network list 205 may include an indication of, for example, a first PLMN 210-a through an $n^{th}$ PLMN 210-n.

Various different PLMN options may be supported by a network such as the wireless communications system 200. For example, a first type of network may be a legacy LTE network which supports only PLMNs that provide connectivity to an LTE EPC. A second type of network may support only PLMNs that provide connectivity to both an LTE EPC and to a 5GCN, or in the example of FIG. 2, to both the first RAT core network 215 and the second RAT core network 220. In cases of either the first type of network or the second type of network in this example, a legacy LTE UE (e.g., the first type of the UE 115-a in the example of FIG. 2) may access the LTE EPC via any PLMN available in the network list 205. For example, the first type of UE 115-a may initiate a connection to the first RAT core network 215 via communication link 125-a, the first PLMN 210-a, and a connection 240 to establish first communication path 245. The first type of UE 115-a also may initiate a connection to the first RAT core network 215 via the communication link 125-a, an $n^{th}$ PLMN 210-n, and a connection 230 to establish a second communication path 250. Similarly, the second type of UE 115-b may establish a connection to the second RAT core network 220 via a communications link 125-b, the base station 105-d, the $n^{th}$ PLMN 210-n (or the first PLMN 210-a), and the connection 235 (or connection the 240) to establish a third communication path 255.

In other cases, one or more PLMNs of a base station network list 205 may be connectable only to the second RAT core network 220 or the first RAT core network 215, with one or more other PLMNs of the network list 205 connectable to the other CN. In such cases, various techniques such as those discussed herein may be used to indicate available PLMNs to different types of UEs 115.

Figure 3:
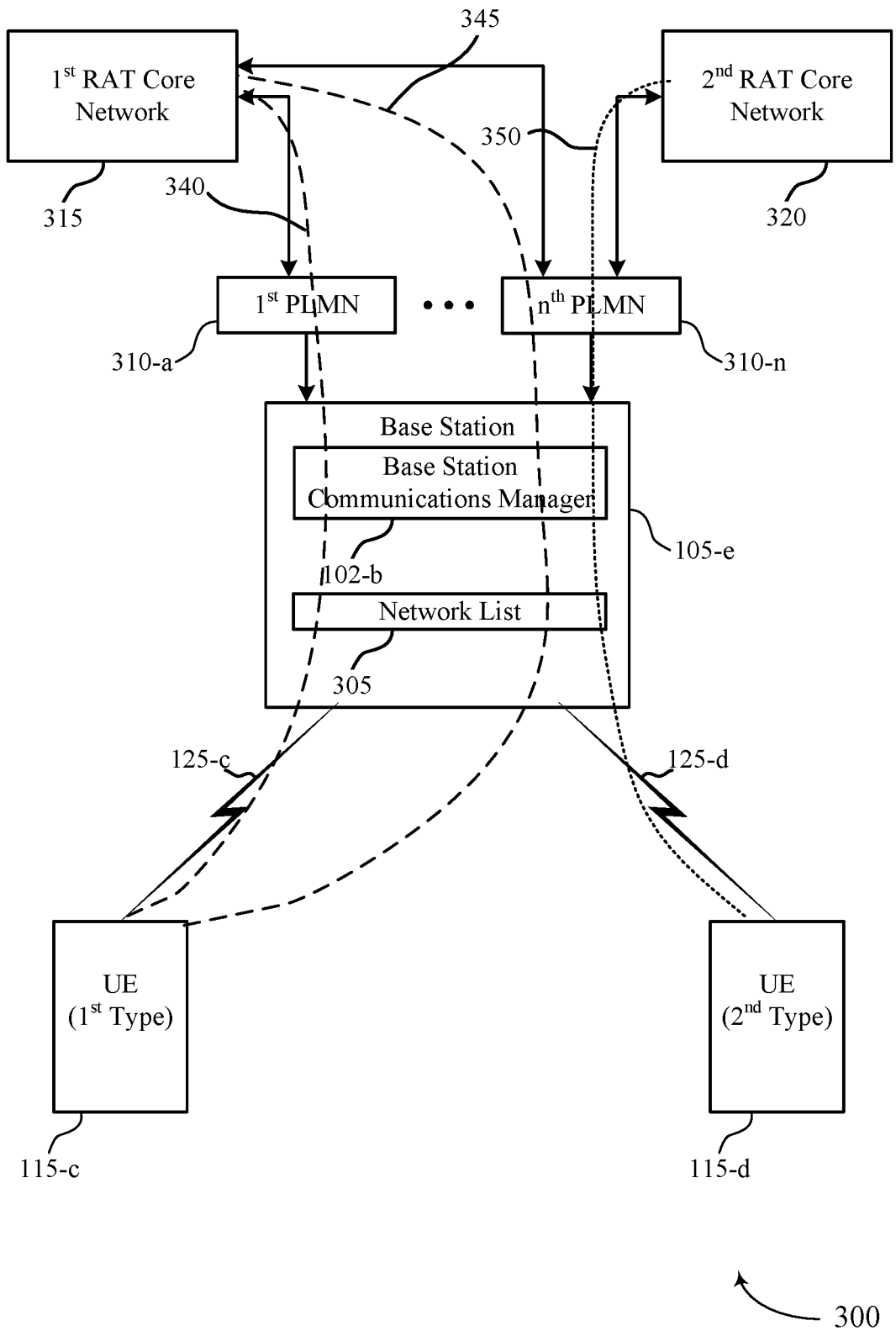
FIG. 3 illustrates another example of a portion of a wireless communications system that supports techniques for determining public land mobile network support of different core networks in accordance with aspects of the present disclosure.

FIG. 3 illustrates an example of a portion of a wireless communications system 300 that supports techniques for determining public land mobile network support of different core networks in accordance with various aspects of the present disclosure. In some examples, wireless communications system 300 may implement aspects of wireless communication system 100.

Similarly as with the example of FIG. 2, two different types of UEs 115 may be present in the wireless communications system 300. A first type of UE 115-c may be capable of accessing, via a base station 105-e, a first RAT core network 315 but not a second RAT core network 320. For example, the first type of UE 115-c may be a legacy UE that is capable of accessing only a 4G EPC, and the first RAT core network 315 may be an LTE EPC and the second RAT core network 320 may be a 5GCN. A second type of UE 115-d may be capable of accessing both the first RAT core network 315 and the second RAT core network 320 via base station 105-e and may be, for example, eLTE UE. Each UE 115 may include a UE communications manager that may perform the functions such as discussed with the UE communications manager of FIG. 1, 6, 7, 8, or 9.

The base station 105-e may include a base station communications manager 102-b, which may be an example of a base station communications manager 102 of FIG. 1, a base station communications manager 1015 of FIGS. 10 and 11, or a base station communications manager 1315 of FIG. 13. The base station 105-e may also include a network list 305, such as a PLMN list, that it may provide to the UEs 115 in one or more IEs (e.g., in a SIB1 transmission). The network list 305 may include an indication of, for example, a first PLMN 310-a through an nth PLMN 310-n.

In this example, all of the PLMNs 310 may be connectable to the first RAT core network 315, but only a subset of PLMNs 310, such as nth PLMN 310-n, may be connectable to the second RAT core network 320. Thus, a mechanism to indicate per-PLMN level type of CN connectivity support is provided either implicitly or explicitly. In some examples, the base station 105-e may configure an eLTE SIB1 to indicate PLMNs 310 that support connectivity to both the first RAT core network 315 and the second RAT core network 320 through one or more specific per-PLMN explicit new IEs. In other examples, the base station 105-e may configure an eLTE SIB1 to indicate PLMNs 310 that support connectivity to both the first RAT core network 315 and the second RAT core network 320 based on a tracking area ID per core network type. In some cases, the new IE may be:

SupportedCoreConnectivity=5GCN & EPC. An example format for communication of such an IE may be:
    PLMN-IdentityInfo::={ PLMN-Identity,
        cellReservedForOperatorUse=ENUMERATED {reserved, notReserved},
    cellReservedForOperatorUse-5gc=ENUMERATED { 5GCNreserved,5GCNnotreserved},
    SupportedCoreConnectivity=ENUM {EPC only, 5GCN only, EPC & 5GCN}} trackingAreaCode, trackingAreaCode-5gc In such examples, for PLMNs connected to the first RAT core network 315 only, there is no need of specific IEs and by default it is providing connectivity to, for example, the EPC core only. The first type of UE 115-c may thus establish communications path 340 or communications path 345 to the first RAT core network 315 via any available PLMN 310. When a second type of UE 115-d (e.g., an eLTE UE) detects a PLMN 310 that has support for both core networks 315, 320, the second type of UE 115-d may select the second RAT core network 320 and indicate to the base station 105-e to request connectivity to the second RAT core network 320 via communications path 350 (e.g., through an AS indication in a connection establishment request).

In some examples, techniques are provided that relate the core network type with a tracking area code of the core network. The type of the core network can be explicitly indicated in an information element, such as EPC only or both EPC and 5GC. Some core networks may have their own tracking area code that may be used to indicate the type of core network. For example, for PMLNs that may connect to two different core networks, separate tracking area codes may be indicated for each core network. That is, the tracking area code can be on a per code network basis. This may provide multiple different tracking area codes for each information element in the place of other information signaled for the core networks. In some examples, a separate tracking area code for each core network type within each PLMN may be used as an indication of the type of core network connectivity for a given PLMN.

In some examples, the core network type can be implicitly determined without using an explicit information element. For example, the CN type connectivity for each PLMN can be implicitly indicated or determined based on per PLMN level separate tracking area codes configured for EPC and 5GC. It is also possible to determine the core network type implicitly from a type of PLMN list in which the PLMN is included. For example, the core network type can be determined based on whether a PLMN is placed in a legacy PLMN list or a 5GC PLMN list. If the PLMN is in the legacy PLMN list, it can be concluded that the PLMN supports 4G EPC. In some cases, the PLMN in the legacy PLMN list may only support 4G EPC. If the PLMN is placed in a 5GC PLMN list, it can be concluded that the PLMN supports 5GC. Thus, the UE or base station may determine the core network type of the PLMN based on the type of list on which the PLMN is included.

Figure 4:
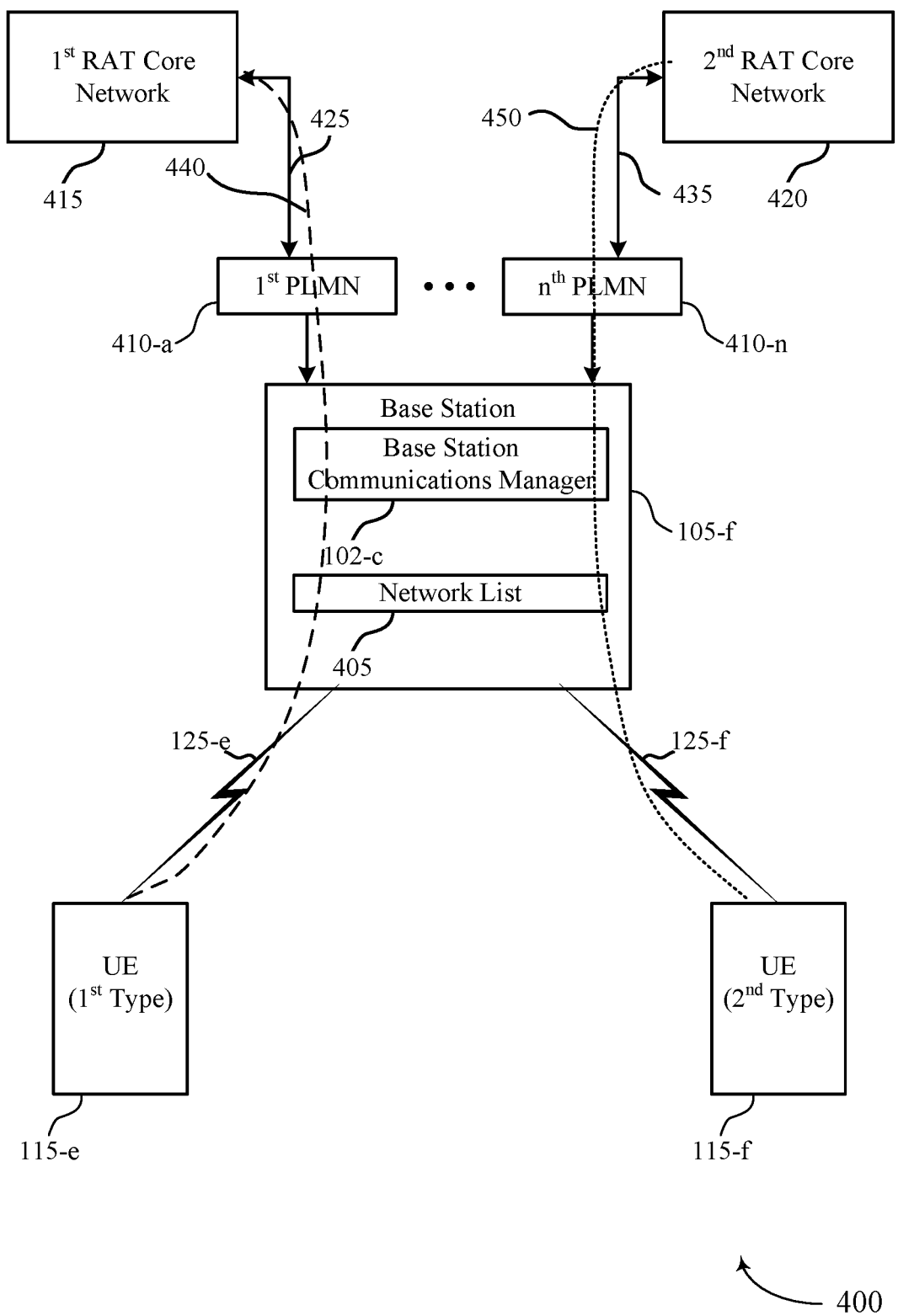
FIG. 4 illustrates another example of a portion of a wireless communications system that supports techniques for determining public land mobile network support of different core networks in accordance with aspects of the present disclosure.

FIG. 4 illustrates an example of a portion of a wireless communications system 400 that supports techniques for determining public land mobile network support of different core networks in accordance with various aspects of the present disclosure. In some examples, wireless communications system 400 may implement aspects of wireless communication system 100.

Similarly as with the above examples, two different types of UEs 115 may be present in the wireless communications system 400. A first type of UE 115-e may be capable of accessing, via a base station 105-f, a first RAT core network 415 but not a second RAT core network 420. For example, the first type of UE 115-e may be a legacy UE that is capable of accessing only a 4G EPC, and the first RAT core network 415 may be an LTE EPC and the second RAT core network 420 may be a 5GCN. A second type of UE 115-f may be capable of accessing both the first RAT core network 415 and the second RAT core network 420 via base station 105-f and may be, for example, eLTE UE. Each UE 115 may include a UE communications manager that may perform the functions such as discussed with the UE communications manager of FIG. 1, 6, 7, 8, or 9.

The base station 105-f may include a base station communications manager 102-c, which may be an example of a base station communications manager 102 of FIG. 1, a base station communications manager 1015 of FIGS. 10 and 11, or a base station communications manager 1315 of FIG. 13. The base station 105-f may also include a network list 405, such as a PLMN list, that it may provide to the UEs 115 in one or more IEs (e.g., in a SIB1 transmission). The network list 405 may include an indication of, for example, a first PLMN 410-a through an nth PLMN 410-n. In this example, some of the PLMNs 410 configured at the base station 105-f may provide connectivity only to the first RAT core network 415, such as first PLMN 410-a, and other PLMSs 410 may provide connectivity only to the second RAT core network 420, such as nth PLMN 410-n. In other examples, the base station 105-f may have one or more PLMNs 410 that may provide connectivity to both the first RAT core network 415 and the second RAT core network 420, and one or more PLMNs that provide connectivity only to the second RAT core network 420. In either case, one or more PLMNs 410 may not be used to provide access to the first RAT core network 415, and it may be desirable to prevent legacy UEs from accessing PLMNs 410 capable of connectivity to only the second RAT core network 420.

In some examples, the base station 105-f may configure a SIB1 to indicate a new IE that provide a list of PLMNs 410 that provide connectivity to the second RAT core network 420. In one example, the base station 105-f may format IEs as follows:

Set eLTE SIB1 "cellBarred IE=Notbarred" on the eLTE base station:
    PLMN-IdentityInfo::=SEQUENCE {PLMN-Identity1, cellReservedForOperatorUse=notReserved
    PLMN-Identity2,
cellReservedForOperatorUse=notReserved,
SupportedCoreConnectivity=ENUM{5GCN & EPC, EPC Only} trackingAreaCode, trackingAreaCode-5gc
    \\PLMNs for Legacy UEs & eLTE UEs, which support connection to both EPC & 5GCN PLMN-IdentityInfo_ext::=SEQUENCE (PLMN-Identity3, cellReservedForOperatorUse=notReserved, PLMN-Identity4, cellReservedForOperatorUse-5gc=5GC notReserved, SupportedCoreConnectivity=5GCN only} trackingAreaCode-5gc PLMNs for eLTE UEs, which support connection to 5GCN Only.

These New PLMNs can only be decoded by the second type of UE 115-*f*, and the first type of UE 115-*e* will not recognize this IE and ignore these PLMNs that are connected only to the second RAT core network 420. An example format is:

PLMN-IdentityInfo_Ext::={ PLMN-Identity, cellReservedForOperatorUse=ENUMERATED {5GCN reserved,5GCN not reserved}, SupportedCoreConnectivity=5GCN only} trackingAreaCode-5gc Thus, legacy UEs such as first type of UE 115-*e* may be prevented from accessing such second RAT core network 420 only PLMNs, and will not attempt to access or camp on such PLMNs.

Figure 5:
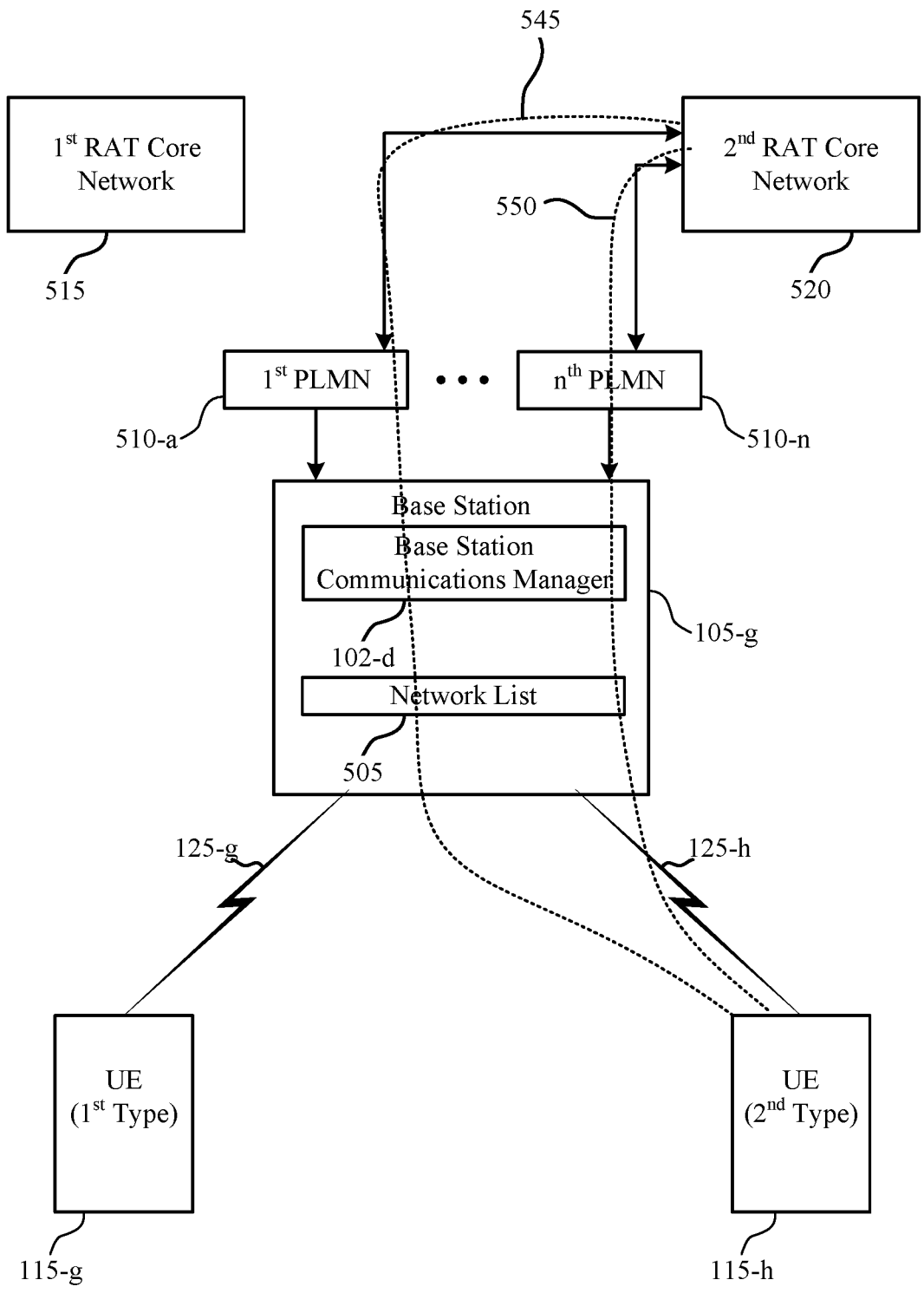
FIG. 5 illustrates another example of a portion of a wireless communications system that supports techniques for determining public land mobile network support of different core networks in accordance with aspects of the present disclosure.

FIG. 5 illustrates an example of a portion of a wireless communications system 500 that supports techniques for determining public land mobile network support of different core networks in accordance with various aspects of the present disclosure. In some examples, wireless communications system 500 may implement aspects of wireless communication system 100.

Similarly as with the above examples, two different types of UEs 115 may be present in the wireless communications system 500. A first type of UE 115-*g* may be capable of accessing, via a base station 105-*g*, a first RAT core network 515 but not a second RAT core network 520. For example, the first type of UE 115-*f* may be a legacy UE that is capable of accessing only a 4G EPC, and the first RAT core network 515 may be an LTE EPC and the second RAT core network 520 may be a 5GCN. A second type of UE 115-*h* may be capable of accessing both the first RAT core network 515 and the second RAT core network 520 via base station 105-*g* and may be, for example, eLTE UE. Each UE 115 may include a UE communications manager that may perform the functions such as discussed with the UE communications manager of FIG. 1, 6, 7, 8, or 9.

The base station 105-*g* may include a base station communications manager 102-*d*, which may be an example of a base station communications manager 102 of FIG. 1, a base station communications manager 1015 of FIGS. 10 and 11, or a base station communications manager 1315 of FIG. 13. The base station 105-*g* may also include a network list 505, such as a PLMN list, that it may provide to the UEs 115 in one or more IEs (e.g., in a SIB1 transmission). The network list 505 may include an indication of, for example, a first PLMN 510-*a* through an nth PLMN 510-*n*. In this example, the base station 105-*f* may have one or more PLMNs 510 that may provide connectivity only to the second RAT core network 520. Thus, none of the PLMNs 510 may be used to provide access to the first RAT core network 515, and it may be desirable to prevent legacy UEs from accessing such second RAT core network 520 only PLMNs 510.

In some examples, the first type of UE 115-*g* may be prevented from accessing any of the PLMNs 510 through signaling that the cell is barred by using a legacy cell barred IE to indicate the PLMNs 510 are barred from access. In case of multiple PLMNs 510 indicated in the SIB1, this field is common for all PLMNs and this prevents legacy UEs from camping on eLTE cells, as a UE 115 is not permitted to select/reselect to such a cell (not even for emergency calls).

The base station 105-*g* may also provide a new IE, that is not recognizable by the first type of UE 115-*g*, to indicate access to the second RAT core network 520. Thus, the second type of UE 115-*h* may recognize the new IE and establish communication path 545 or communication path 550 to the second RAT core network 520. The second type of UE 115-*h* may ignore the legacy cell barred IE and use the new IE to determine access to each PLMN 510. In one example, the legacy cell barred IE and new cell barred IE may be set as:

Set eLTE SIB1 "cellBarred IE=barred"
define New IE "cellBarred_ext IE=not barred".

In such examples, both Legacy UEs and eLTE UEs can continue to use legacy Access classes (i.e., AC: 0 to 15) as configured in USIM, and there is no need to introduce new Access Class numbers for eLTE UEs and this does not have any impact on USIM.

In other examples, for the first type of UEs 115-*g* that use Access Classes AC 0-15, the cell barred IE for legacy UEs may be set to barred (e.g., Set eLTE SIB1 "cellBarred IE=barred"). In case of multiple PLMNs 510 indicated in SIB1, this field is common for all PLMNs 510 and this prevents first type of UEs 115-*g* from camping on eLTE cells. In such examples, for the second type of UE 115-*h*, new Access Classes AC 16-31 (Equivalent to legacy AC 0-15) are introduced, and a new IE is defined as "cellBarred_ext IE=not barred". When a second type of UE 115-*h* is camping on base station 105-*g*, it can use new Access Classes for an access control mechanism and the new IE is applicable only for new access class. The second type of UE 115-*h* also may ignore the legacy cellBarred IE. Thus, the second type of UE 115-*h* will support both legacy Access Classes and new Access Classes, in which a legacy Access Class will be used when the second type of UE 115-*h* camps on a legacy LTE EPC cell, and a new Access Class may be used when such as UE 115-*h* camps on a cell having access to the second RAT core network 520.

In further examples, all PLMNs 510 may be specified as being connected to the second RAT core network 520 only, similarly as in legacy E-UTRAN, and an explicit new IE may be provided to indicate second RAT core network 520 connectivity per PLMN. In other examples, LL PLMNs 510 may be specified as being connected to the second RAT code network 520 implicitly based on a tracking area code for 5GCN. This may allow a second type of UE 115-*h* to select these PLMNs 510 for connectivity with the second RAT core network 520. In one example, a format for PLMN identification may be:

PLMN-IdentityInfo::={ PLMN-Identity, cellReservedForOperatorUse=ENUMERATED {reserved, notReserved}, cellReservedForOperatorUse-5gc=ENUMERATED { 5GCNreserved,5GCNnotreserved},
SupportedCoreConnectivity=ENUM {EPC only, 5GCN only, EPC & 5GCN}} trackingAreaCode, trackingAreaCode-5gc For Legacy UEs, which use Access Classes AC 0-15, the base station 105-*g* may set the cell barred IE as: "cellBarred IE=barred". This field is common for all PLMNs and this prevents the first type of UE 115-*g* from camping on any cells of the base station 105-*g*. For the second type of UE 115-*h*, with or without configuration of new Access Classes, a new IE may be defined as: "cellBarred_ext IE=not barred".

The second type of UE 115-*h* may only consider new IE "cellBarred_ext IE" and may ignore the legacy "cellBarred IE."

In still further examples, a closed subscriber group (CSG) may be used to prevent legacy UEs from accessing a PLMN that serves only a 5GCN. In such examples, a first type of UE 115-*g* may use legacy Access Classes AC 0-15, and the base station 105-*g* may set, in SIB1: "cellBarred IE=Notbarred", CSG Indication=TRUE, CSG_Id=CSGID specific to eLTE UEs. When a first type of UE 115-*g* camps on this cell, it may determines that the particular cell is a "CSG Cell" and that the first type of UE 115-*g* does not belong to the CSG Group, which results in the first type of UE 115-*g* leaving cells of the base station 105-*g* and trying find another suitable cell on same frequency. The second type of UE 115-*h* may be configured with a special CSG ID that is specific to the second type of UE 115-*h* that is capable of accessing the second RAT core network 520. The second type of UE 115-*h* may use the special CSG ID to establish a connection via a PLMN 510.

In various examples, UEs 115 such as described in FIGS. 1-5 that support only LTE EPC connectivity may perform PLMN selection according to established PLMN selection techniques. After PLMN selection, cell selection procedure is performed as defined in existing standards. Upon completion of the cell selection procedure, such a UE performs EPC NAS procedures over E-UTRA (i.e. Mobility Management, Session Management, etc.). In cases where a UE 115 supports both LTE EPC and 5GCN NAS connectivity, such a UE may perform PLMN selection and then decide which NAS to use based on identified system information provided by the base station. For example, a UE supporting EPC NAS and 5GCN NAS may initiate 5GC NAS procedures when 5GCN is supported by the serving PLMN. 5GCN support may be indicated in AS as supported on a per-PLMN basis, based on one of the techniques such as discussed above with respect to FIGS. 2-5.

Figure 6:
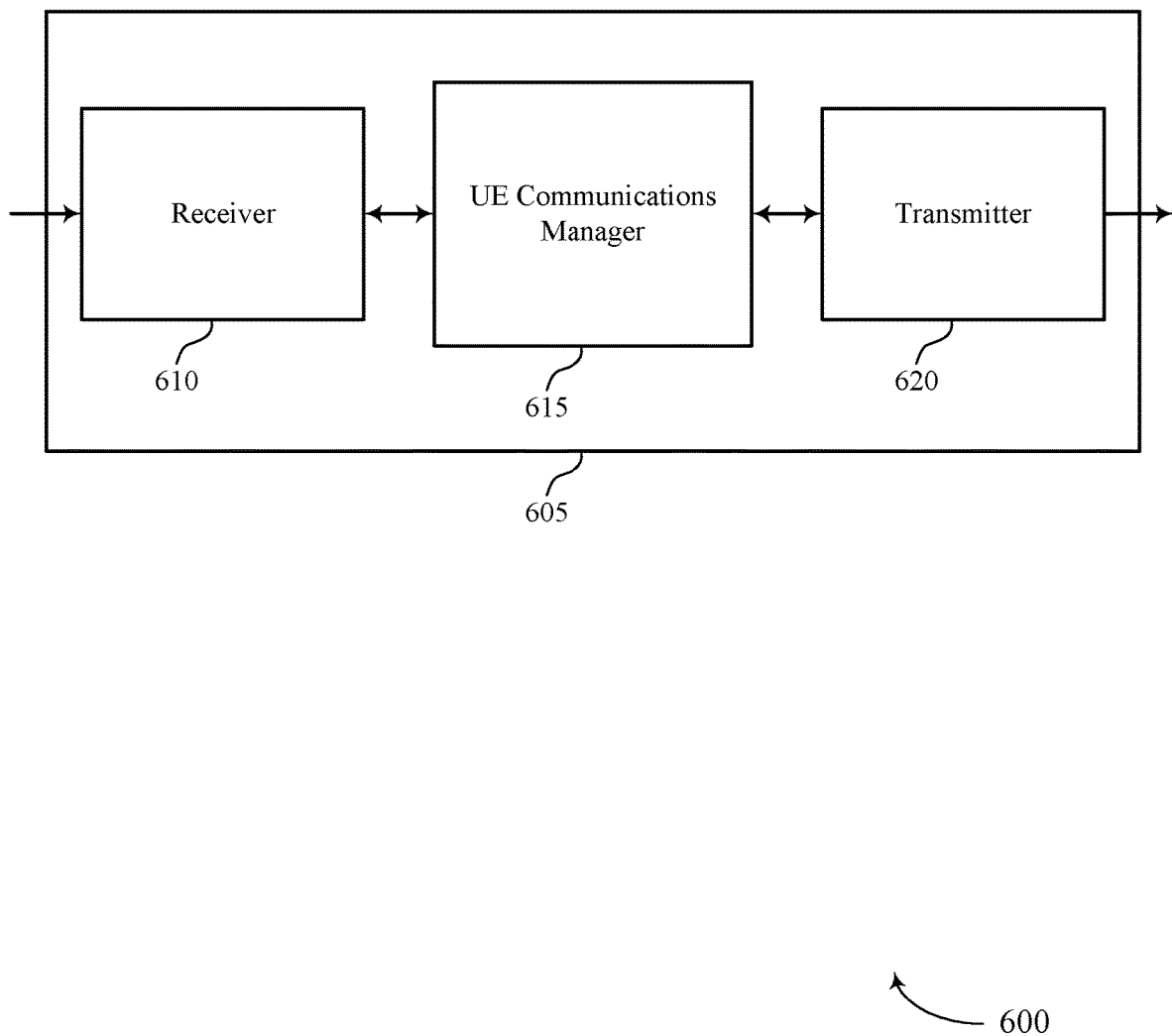
FIGS. 6 through 8 show block diagrams of a device that supports techniques for determining public land mobile network support of different core networks in accordance with aspects of the present disclosure.

FIG. 6 shows a block diagram 600 of a wireless device 605 that supports techniques for determining public land mobile network support of different core networks in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to techniques for determining public land mobile network support of different core networks, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9 or UE communications manager 101 described with reference to FIG. 1.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, from a base station, one or more IEs indicating a list of networks that are available via the base station, determine a type of core network associated with each network in the list of networks, based on the one or more IEs and whether each network served by the base station is capable of providing access to a first type of core network or to both the first type of core network and a second type of core network, and initiate a connection establishment to the first type of core network via a first network of the list of networks based on determining that the first network is capable of providing access to the first type of core network.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
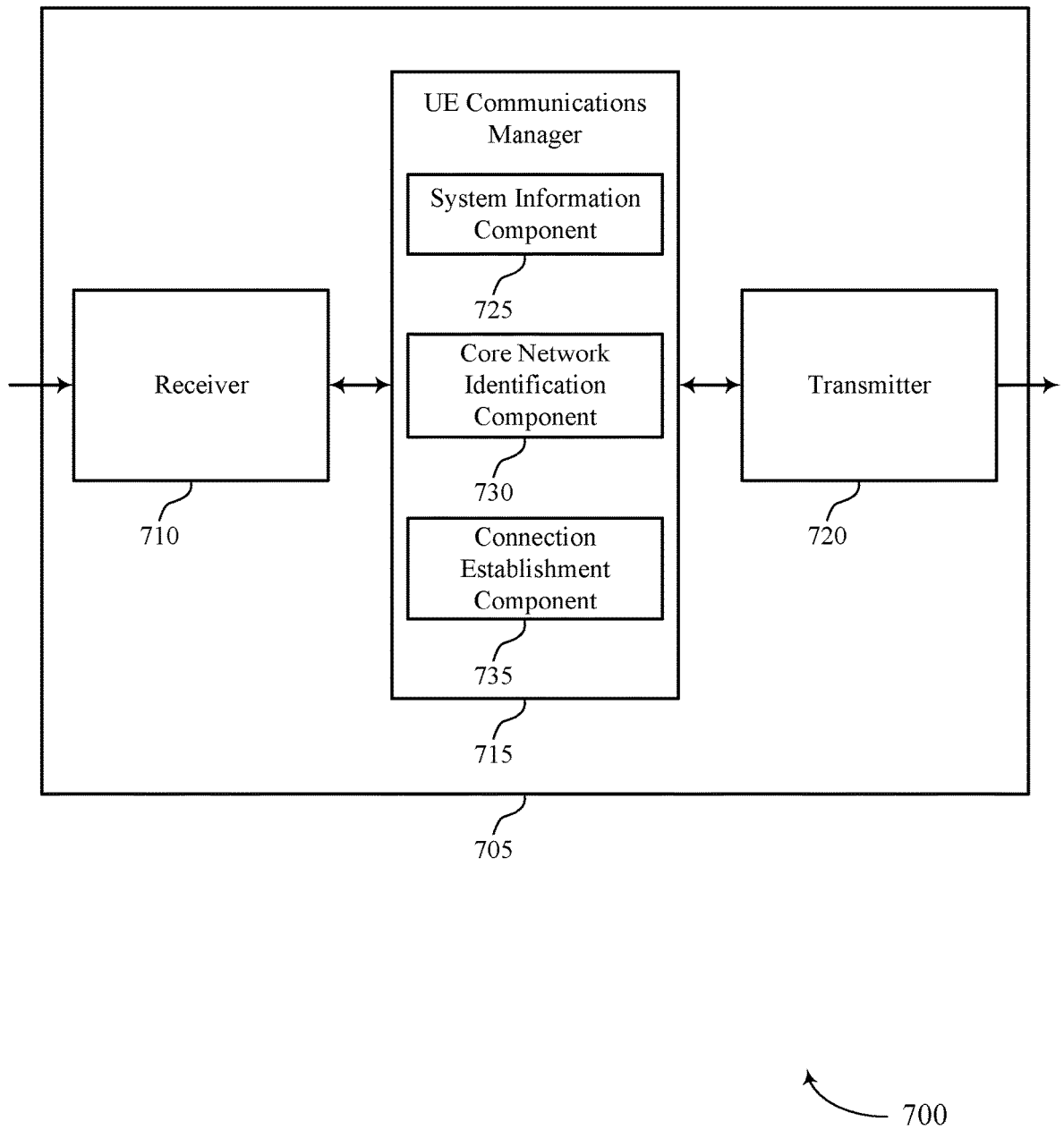

FIG. 7 shows a block diagram 700 of a wireless device 705 that supports techniques for determining public land mobile network support of different core networks in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for determining public land mobile network support of different core networks, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9 or UE communications manager 101 described with reference to FIG. 1. UE communications manager 715 may also include system information component 725, core network identification component 730, and connection establishment component 735.

System information component 725 may receive, from a base station, one or more information elements (IEs) indicating a list of networks that are available via the base station. In some cases, a first IE that is unrecognizable by a second type of UE indicates that a first type of UE is not barred from accessing the base station, the first type of UE being capable of accessing the first type of core network. In some cases, a second IE recognizable by the second type of UE indicates that UEs are barred from accessing the base station, the second type of UE being incapable of accessing the first type of core network and being incapable of recognizing the first IE. In some cases, the first type of UE ignores the second IE.

Core network identification component 730 may determine a type of core network associated with each network in the list of networks, based on the one or more IEs and whether each network served by the base station is capable of providing access to a first type of core network or to both the first type of core network and a second type of core network.

Connection establishment component 735 may initiate a connection establishment to the first type of core network via a first network (e.g., a PLMN) of the list of networks based on determining that the first network is capable of providing access to the first type of core network and initiate a connection establishment to the second type of core network based on determining that each network of the list of networks is incapable of providing access to the first type of core network. In some cases, the initiating includes formatting an access stratum (AS) indication that indicates the first type of core network, and transmitting the AS indication to the base station.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
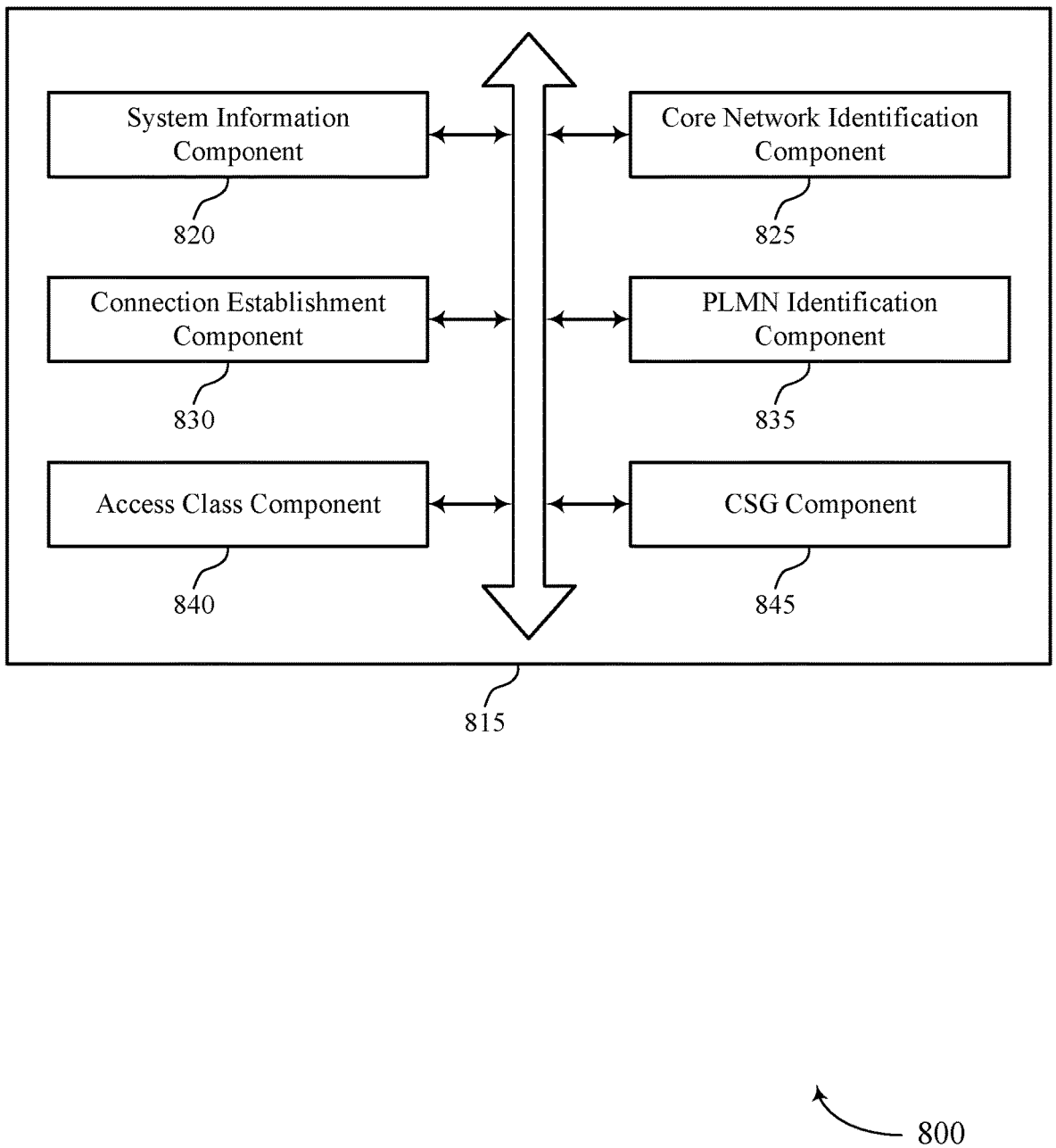

FIG. 8 shows a block diagram 800 of a UE communications manager 815 that supports techniques for determining public land mobile network support of different core networks in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include system information component 820, core network identification component 825, connection establishment component 830, PLMN identification component 835, access class component 840, and CSG component 845. Each of these modules may communicate, directly or indirectly, with one another (e.g., via one or more buses).

System information component 820 may receive, from a base station, one or more IEs indicating a list of networks that are available via the base station. In some cases, a first IE indicates that a first type of UE is not barred from accessing the base station, the first type of UE being capable of accessing the first type of core network. In some cases, a second IE recognizable by a second type of UE indicates that UEs are barred from accessing the base station, the second type of UE being incapable of accessing the first type of core network and being incapable of recognizing the first IE. In some cases, the first type of UE ignores the second IE.

Core network identification component 825 may determine a type of core network associated with each network in the list of networks, based on the one or more IEs and whether each network served by the base station is capable of providing access to a first type of core network or to both the first type of core network and a second type of core network.

Connection establishment component 830 may initiate a connection establishment to the first type of core network via a first network of the list of networks based on determining that the first network is capable of providing access to the first type of core network and initiate a connection establishment to the second type of core network based on determining that each network of the list of networks is incapable of providing access to the first type of core network. In some cases, the initiating includes formatting an AS indication that indicates the first type of core network, and transmitting the AS indication to the base station.

PLMN identification component 835 may identify one or more PLMNs provided by a base station in a network list. In some cases, the list of networks includes a list of public land mobile network (PLMN) IDs, and where the receiving includes receiving, for a set of PLMNs served by the base station, a per-PLMN IE that indicates that an associated PLMN can provide access to the second type of core network or that the associated PLMN can provide access to both the first type of core network and the second type of core network. In some cases, the receiving includes receiving the list of networks in a first IE that indicates one or more public land mobile networks (PLMNs) that are capable of providing access only to the first type of core network. In some cases, the receiving further includes receiving a second IE that indicates one or more other PLMNs that are capable of providing access to the first type of core network or both the first type of core network and the second type of core network, where the first IE is recognizable by a first type of UE capable of accessing the first type of core network, and the second IE is recognizable by the first type of UE and a second type of UE that is incapable of accessing the first type of core network. In some cases, the receiving further includes receiving an indication in the first IE, on a per-network basis, of one or more networks served by the base station that are capable of providing access to the first type of core network.

Access class component 840 may identify supported access classes at a base station. In some cases, a first type of UE that is capable of accessing the first type of core network has a first access class that is different than a second access class of second type of UE that is incapable of accessing the first type of core network. In some cases, the one or more IEs indicate which networks of the list of networks are accessible to one or more UEs of the first access class. In some cases, the first type of UE is configured with both the first access class and the second access class, and uses the first access class for access to the first type of core network and uses the second access class for access to the second type of core network. In some cases, a first IE recognizable by the first type of UE indicates that UEs of the first access class are not barred from accessing the base station. In some cases, a second IE recognizable by a second type of UE indicates that UEs are barred from accessing the base station, the second type of UE being incapable of recognizing the first IE.

CSG component 845 may identify a CSG associated with a base station and determine of the UE can access the CSG. In some cases, the UE may receive a CSG identification that indicates that the base station is closed to UEs that are incapable of accessing the first type of core network. In some cases, a first type of UE that is capable of accessing the first type of core network is configured with a CSG access identification that corresponds to the CSG identification, and thus such a UE may access the first type of network.

Figure 9:
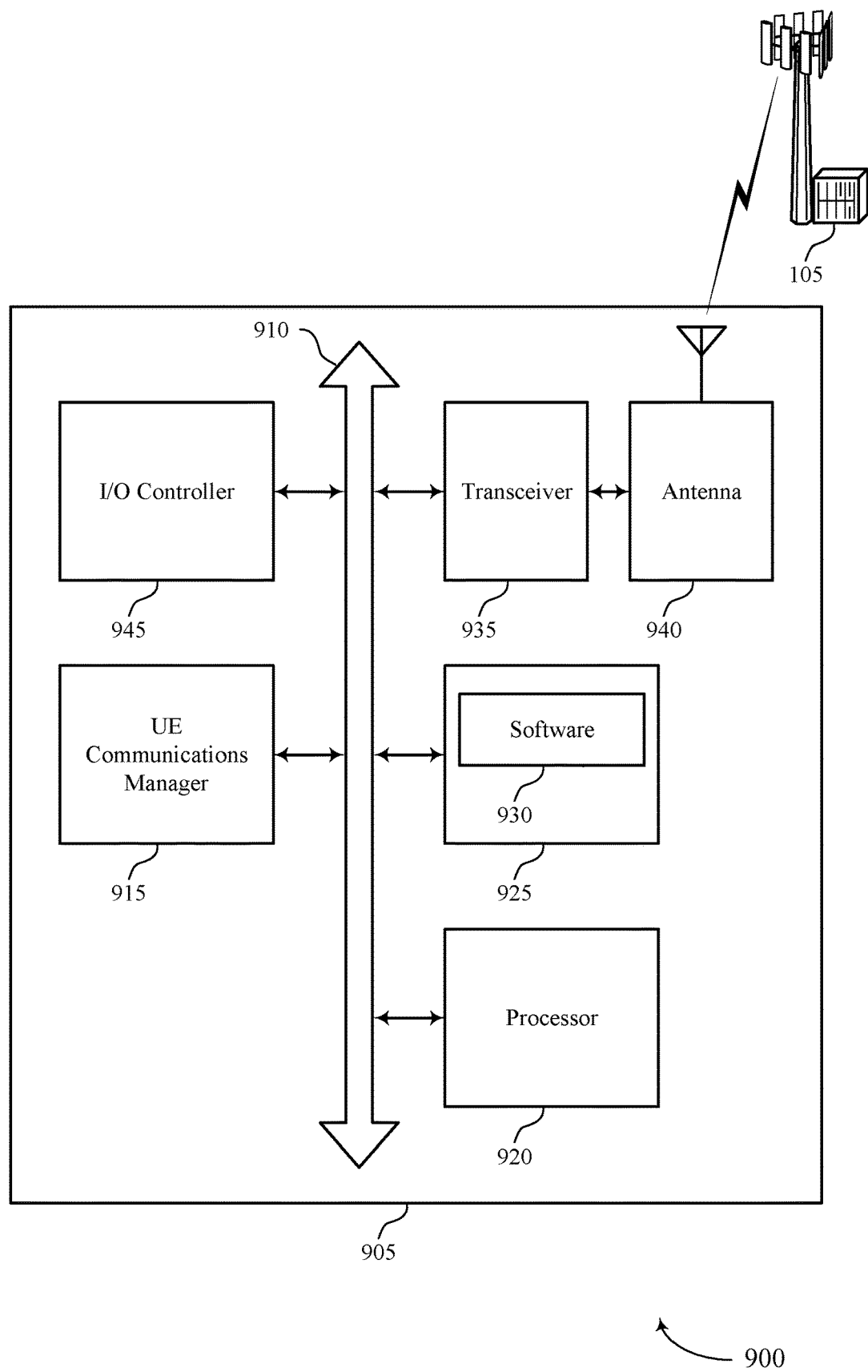
FIG. 9 illustrates a block diagram of a system including a UE that supports techniques for determining public land mobile network support of different core networks in accordance with aspects of the present disclosure.

FIG. 9 shows a diagram of a system 900 including a device 905 that supports techniques for determining public land mobile network support of different core networks in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting techniques for determining public land mobile network support of different core networks).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support techniques for determining public land mobile network support of different core networks. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

FIG. 10 shows a block diagram 1000 of a wireless device 1005 that supports techniques for determining public land mobile network support of different core networks in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for determining public land mobile network support of different core networks, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13 or a base station communications manager 102 of FIG. 1.

Base station communications manager 1015 and/or at least some of its various sub-components may be implemented in hardware, software executed by a processor, firmware, or any combination thereof If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit to a UE, by a base station, one or more information elements (IEs) that indicate a list of networks that are available via the base station, where the one or more IEs are recognizable by a first type of UE that is capable of accessing a first type of core network, and where one or more of the IEs indicate whether each of the networks in the list of networks is capable of providing access to the first type of core network or both the first type of core network and a second type of core network and receive a request from the UE to establish a connection with the first type of core network via one of the networks that is capable of providing access to the first type of core network.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

FIG. 11 shows a block diagram 1100 of a wireless device 1105 that supports techniques for determining public land mobile network support of different core networks in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for determining public land mobile network support of different core networks, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13, or a base station communications manager 102 of FIG. 1. Base station communications manager 1115 may also include system information component 1125 and connection establishment component 1130.

System information component 1125 may transmit to a UE one or more information elements (IEs) that indicate a list of networks that are available via the base station, where the one or more IEs are recognizable by a first type of UE that is capable of accessing a first type of core network, and where one or more of the IEs indicate whether each of the networks in the list of networks is capable of providing access to the first type of core network or both the first type of core network and a second type of core network. In some cases, the one or more IEs indicate that the first type of UE is not barred from accessing the base station and where the transmitting further includes transmitting a second IE recognizable by a second type of UE that indicates that UEs are barred from accessing the base station, the second type of UE being incapable of accessing the first type of core network. In some cases, the transmitting further includes transmitting, on a per-network basis, an indication that one or more of the networks served by the base station are capable of providing access to the first type of core network.

Connection establishment component 1130 may receive a request from the UE to establish a connection with the first type of core network via one of the networks that is capable of providing access to the first type of core network. In some cases, the receiving includes receiving an AS indication in a connection establishment request that indicates the first type of core network.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
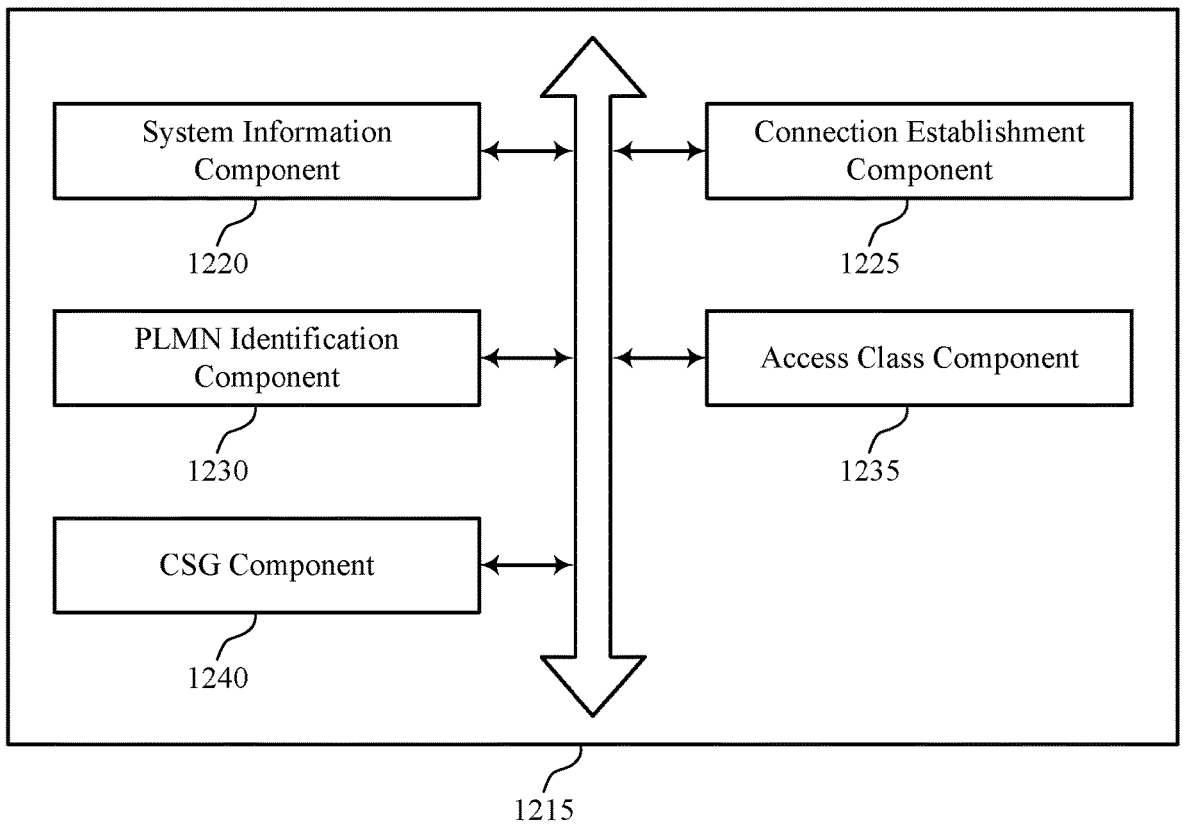

FIG. 12 shows a block diagram 1200 of a base station communications manager 1215 that supports techniques for determining public land mobile network support of different core networks in accordance with aspects of the present disclosure. The base station communications manager 1215 may be an example of aspects of a base station communications manager 1315 described with reference to FIGS. 10, 11, and 13. The base station communications manager 1215 may include system information component 1220, connection establishment component 1225, PLMN identification component 1230, access class component 1235, and CSG component 1240. Each of these modules may communicate, directly or indirectly, with one another (e.g., via one or more buses).

System information component 1220 may transmit to a UE, by a base station, one or more information elements (IEs) that indicate a list of networks that are available via the base station, where the one or more IEs are recognizable by a first type of UE that is capable of accessing a first type of core network, and where one or more of the IEs indicate whether each of the networks in the list of networks is capable of providing access to the first type of core network or both the first type of core network and a second type of core network. In some cases, the one or more IEs indicate that the first type of UE is not barred from accessing the base station and where the transmitting further includes transmitting a second IE recognizable by a second type of UE that indicates that UEs are barred from accessing the base station, the second type of UE being incapable of accessing the first type of core network. In some cases, the transmitting further includes transmitting, on a per-network basis, an indication that one or more of the networks served by the base station are capable of providing access to the first type of core network.

Connection establishment component 1225 may receive a request from the UE to establish a connection with the first type of core network via one of the networks that is capable of providing access to the first type of core network. In some cases, the receiving includes receiving an AS indication in a connection establishment request that indicates the first type of core network.

PLMN identification component 1230 may identify one or more PLMNs available at a base station. In some cases, the list of networks includes a list of public land mobile network (PLMN) IDs, and where the transmitting includes transmitting, for a set of PLMNs served by the base station, a per-PLMN IE that indicates that an associated PLMN can provide access to the second type of core network or that the associated PLMN can provide access to both the first type of core network and the second type of core network. In some cases, the list of networks includes a list of public land mobile network (PLMN) IDs, and where the transmitting includes transmitting a PLMN list in the one or more IEs that indicates one or more PLMNs that are capable of providing access only to the first type of core network. In some cases, the transmitting further includes transmitting a second IE that indicates one or more other PLMNs that are capable of providing access to the first type of core network or both the first type of core network and the second type of core network, where the second IE is recognizable by the first type of UE and by a second type of UE that is incapable of accessing the first type of core network.

Access class component 1235 may identify an access class associated with UEs that are capable of accessing different types of core networks. In some cases, the first type of UE has a first access class that is different than a second access class of a second type of UE that is incapable of accessing the first type of core network. In some cases, the one or more IEs indicate which networks of the list of networks are accessible to one or more UEs of the first access class. In some cases, the first type of UE is configured with both the first access class and the second access class, and uses the first access class for access to the first type of core network and uses the second access class for access to the second type of core network. In some cases, a first IE recognizable by the first type of UE indicates that UEs of the first access class are not barred from accessing the base station. In some cases, a second IE recognizable by the second type of UE indicates that UEs are barred from accessing the base station, the second type of UE being incapable of recognizing the first IE.

CSG component 1240 may transmit a CSG identification that indicates that the base station is closed to UEs that are incapable of accessing the first type of core network. In some cases, the first type of UE is configured with a CSG access identification that corresponds to the CSG identification.

FIG. 13 shows a diagram of a system 1300 including a device 1305 that supports techniques for determining public land mobile network support of different core networks in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting techniques for determining public land mobile network support of different core networks).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support techniques for determining public land mobile network support of different core networks. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core networks (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
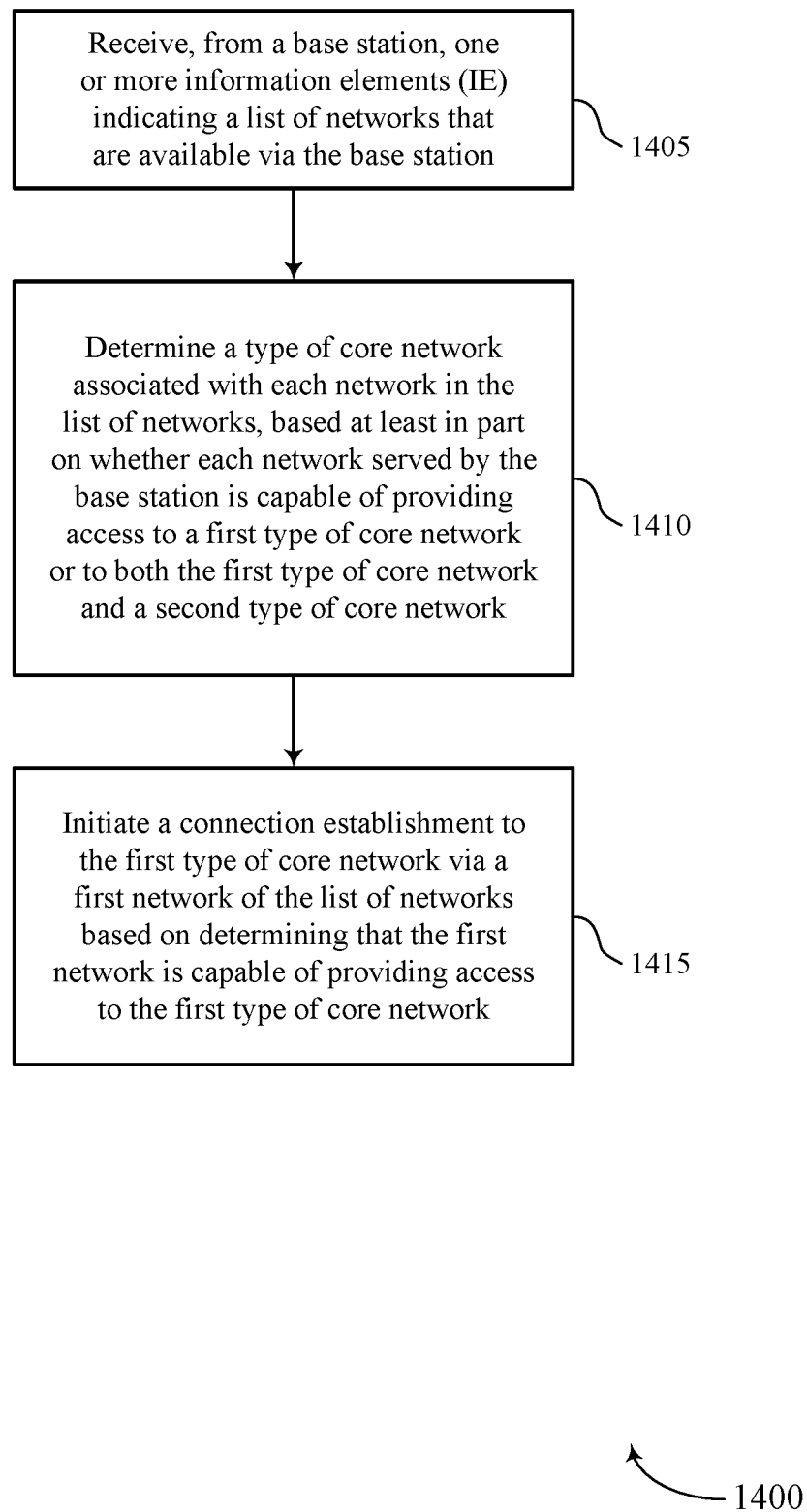
FIGS. 14 through 16 illustrate methods for techniques for determining public land mobile network support of different core networks in accordance with aspects of the present disclosure.

FIG. 14 shows a flowchart illustrating a method 1400 for techniques for determining public land mobile network support of different core networks in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may receive, from a base station, one or more IEs indicating a list of networks that are available via the base station. The operations of block 1405 may be performed according to the methods described herein. In certain examples, aspects of the operations of block 1405 may be performed by a system information component as described with reference to FIGS. 6 through 9.

At block 1410, the UE 115 may determine a type of core network associated with each network in the list of networks, based at least in part on whether each network served by the base station is capable of providing access to a first type of core network or to both the first type of core network and a second type of core network. The operations of block 1410 may be performed according to the methods described herein. In certain examples, aspects of the operations of block 1410 may be performed by a core network identification component as described with reference to FIGS. 6 through 9.

At block 1415, the UE 115 may initiate a connection establishment to the first type of core network via a first network of the list of networks based at least in part on determining that the first network is capable of providing access to the first type of core network. The operations of block 1415 may be performed according to the methods described herein. In certain examples, aspects of the operations of block 1415 may be performed by a connection establishment component as described with reference to FIGS. 6 through 9.

Figure 15:
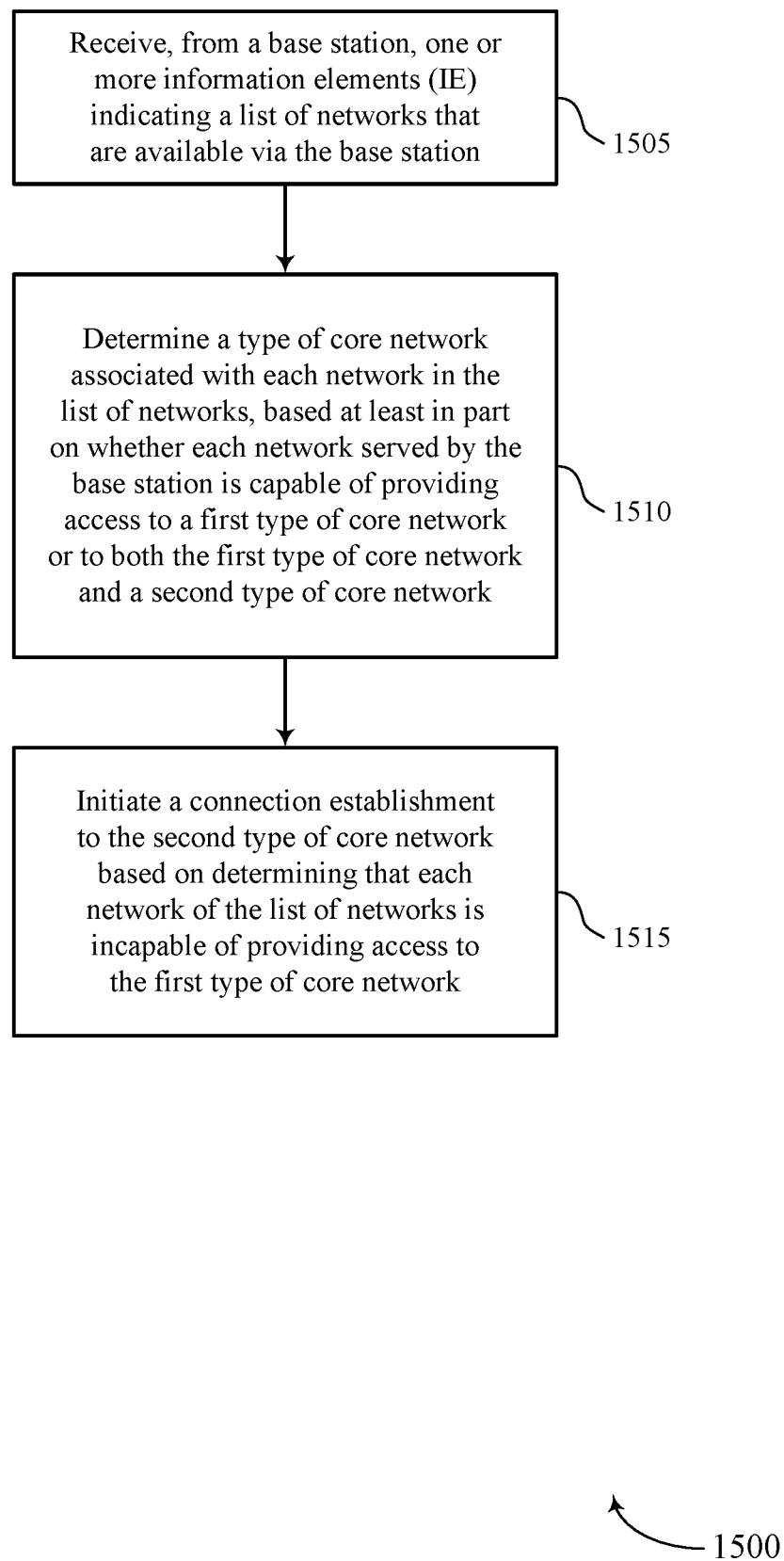

FIG. 15 shows a flowchart illustrating a method 1500 for techniques for determining public land mobile network support of different core networks in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may receive, from a base station, one or more IEs indicating a list of networks that are available via the base station. The operations of block 1505 may be performed according to the methods described herein. In certain examples, aspects of the operations of block 1505 may be performed by a system information component as described with reference to FIGS. 6 through 9.

At block 1510, the UE 115 may determine a type of core network associated with each network in the list of networks, based at least in part on whether each network served by the base station is capable of providing access to a first type of core network or to both the first type of core network and a second type of core network. The operations of block 1510 may be performed according to the methods described herein. In certain examples, aspects of the operations of block 1510 may be performed by a core network identification component as described with reference to FIGS. 6 through 9.

At block 1515, the UE 115 may initiate a connection establishment to the second type of core network based at least in part on determining that each network of the list of networks is incapable of providing access to the first type of core network. The operations of block 1515 may be performed according to the methods described herein. In certain examples, aspects of the operations of block 1515 may be performed by a connection establishment component as described with reference to FIGS. 6 through 9.

Figure 16:
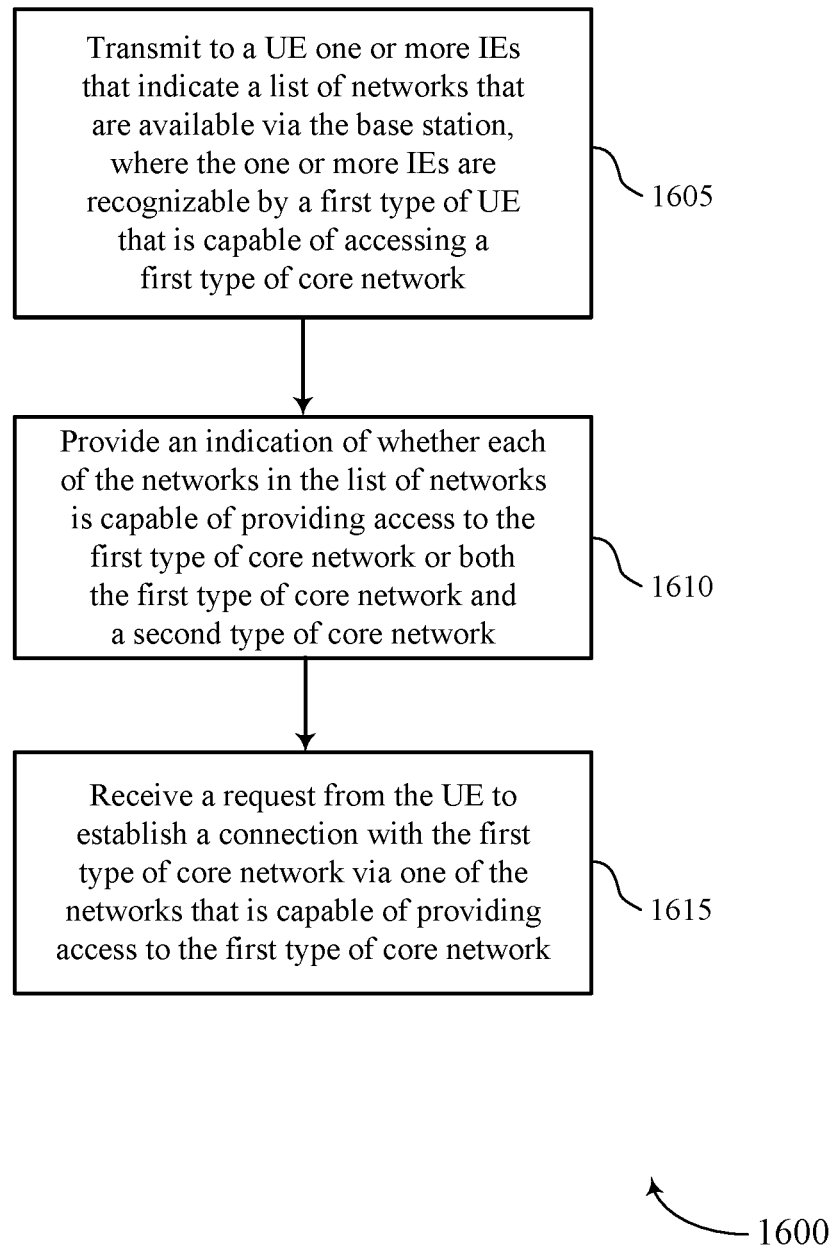

FIG. 16 shows a flowchart illustrating a method 1600 for techniques for determining public land mobile network support of different core networks in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit to a UE one or more information elements (IEs) that indicate a list of networks that are available via the base station, wherein the one or more IEs are recognizable by a first type of UE that is capable of accessing a first type of core network. The operations of block 1605 may be performed according to the methods described herein. In certain examples, aspects of the operations of block 1605 may be performed by a system information component as described with reference to FIGS. 10 through 13.

At block 1610 the base station 105 may provide an indication of whether each of the networks in the list of networks is capable of providing access to the first type of core network or both the first type of core network and a second type of core network. In some examples, the one or more of the IEs indicate whether each of the networks in the list of networks is capable of providing access to the first type of core network or both the first type of core network and a second type of core network. In other examples, the indication can be implicitly provided. For example, the base station 105 may provide one or more PLMN lists. A UE can determine the type of core network provided by the type of list in which the PLMN is included. In other examples, the base station may provide a per PLMN based tracking area code indication for each core network type. From the tracking area code, the UE can determine which type of network the PLMN supports. Alternatively, the base station may provide an indication associated with a PLMN database, which may be used to determine which core network types a PLMN supports. The operations of block 1610 may be performed according to the methods described herein. In certain examples, aspects of the operations of block 1610 may be performed by a system information component as described with reference to FIGS. 10 through 13.

At block 1615 the base station 105 may receive a request from the UE to establish a connection with the first type of core network via one of the networks that is capable of providing access to the first type of core network. The operations of block 1615 may be performed according to the methods described herein. In certain examples, aspects of the operations of block 1615 may be performed by a connection establishment component as described with reference to FIGS. 10 through 13.

It should be noted that the methods described above describe possible implementations, and that the operations and the described functions may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary block that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a base station, one or more system information blocks (SIBs) including one or more information elements (IEs) indicating a list of networks that are available via the base station;
   using the one or more IEs that were included in the one or more SIBs to determine a type of core network associated with each network in the list of networks, based at least in part on the one or more IEs that were included in the one or more SIBs indicating whether each network served by the base station is capable of providing access to at least one of a first type of core network or a second type of core network, wherein the type of core network identifies a radio access technology (RAT) of the core network, and wherein determining the type of core network is based at least in part on one or more of a per public land mobile network (PLMN) based tracking area code indication for each type of core network, an indication associated with a PLMN database, or, for each PLMN, a type of the list of networks that contains the PLMN; and
   initiating a connection establishment to the first type of core network via a first network of the list of networks based at least in part on determining that the first network is capable of providing access to the first type of core network.

2. The method of claim 1, wherein the list of networks comprises a list of PLMN IDs, and wherein the receiving comprises:
   receiving, for a plurality of PLMNs served by the base station, a per-PLMN IE that indicates that an associated PLMN can provide access to the second type of core network or that the associated PLMN can provide access to both the first type of core network and the second type of core network.

3. The method of claim 2, wherein the initiating comprises:
   formatting an access stratum (AS) indication that indicates the first type of core network, and transmitting the AS indication to the base station.

4. The method of claim 1, wherein the receiving further comprises:
   receiving a second IE that indicates that the list of networks comprises a list of PLMN IDs that are capable of providing access to the second type of core network.

5. The method of claim 1, further comprising:
   initiating a connection establishment to the second type of core network based at least in part on determining that each network of the list of networks is incapable of providing access to the first type of core network.

6. The method of claim 1, wherein the receiving comprises:
   receiving the list of networks in a first IE that indicates one or more PLMNs that are capable of providing access only to the first type of core network.

7. A method for wireless communication, comprising:
   receiving, from a base station, one or more information elements (IEs) indicating a list of networks that are available via the base station, comprising:
      receiving the list of networks in a first IE that indicates one or more public land mobile networks (PLMNs) that are capable of providing access only to a first type of core network; and
      receiving a second IE that indicates one or more other PLMNs that are capable of providing access to the first type of core network or both the first type of core network and a second type of core network, wherein the first IE is recognizable by a first type of UE capable of accessing the first type of core network, and the second IE is recognizable by the first type of UE and a second type of UE that is incapable of accessing the first type of core network;

determining a type of core network associated with each network in the list of networks, based at least in part on whether each network served by the base station is capable of providing access to the first type of core network or to both the first type of core network and the second type of core network, and based at least in part on one or more of a per PLMN based tracking area code indication for each type of core network, an indication associated with a PLMN database, or, for each PLMN, a type of the list of networks that contains the PLMN; and initiating a connection establishment to the first type of core network via a first network of the list of networks based at least in part on determining that the first network is capable of providing access to the first type of core network.

8. A method for wireless communication, comprising:

receiving, from a base station, one or more information elements (IEs) indicating a list of networks that are available via the base station, the one or more IEs comprising:
  a first IE that indicates that a first type of UE is not barred from accessing the base station, the first type of UE being capable of accessing a first type of core network; and
  a second IE recognizable by a second type of UE that indicates that UEs are barred from accessing the base station, the second type of UE being incapable of accessing the first type of core network and being incapable of recognizing the first IE;

determining a type of core network associated with each network in the list of networks, based at least in part on whether each network served by the base station is capable of providing access to the first type of core network or to both the first type of core network and a second type of core network, and based at least in part on one or more of a per PLMN based tracking area code indication for each type of core network, an indication associated with a PLMN database, or, for each PLMN, a type of the list of networks that contains the PLMN; and initiating a connection establishment to the first type of core network via a first network of the list of networks based at least in part on determining that the first network is capable of providing access to the first type of core network.

9. The method of claim 8, wherein the first type of UE ignores the second IE.

10. The method of claim 8, wherein the receiving further comprises:
  receiving an indication in the first IE, on a per-network basis, of one or more networks served by the base station that are capable of providing access to the first type of core network.

11. A device for wireless communications, comprising:
a processor; and
a memory coupled with the processor, the memory embodying instructions, the instructions being executable by the processor to cause the device to:
  receive, from a base station, one or more system information blocks (SIBs) including one or more information elements (IE) indicating a list of networks that are available via the base station;
  use the one or more IEs that were included in the one or more SIBs to determine a type of core network associated with each network in the list of networks, based at least in part on the one or more IEs that were included in the one or more SIBs indicating whether each network served by the base station is capable of providing access to at least one of a first type of core network or a second type of core network, wherein the type of core network identifies a radio access technology (RAT) of the core network, and wherein determining the type of core network is based at least in part on one or more of a per public land mobile network (PLMN) based tracking area code indication for each type of core network, an indication associated with a PLMN database, or, for each PLMN, a type of the list of networks that contains the PLMN; and
  initiate a connection establishment to the first type of core network via a first network of the list of networks based at least in part on determining that the first network is capable of providing access to the first type of core network.

12. The device of claim 11, wherein the list of networks comprises a list of PLMN IDs, and wherein the instructions being executable by the processor to cause the device to receive comprise:
  instructions being executable by the processor to cause the device to receive, for a plurality of PLMNs served by the base station, a per-PLMN IE that indicates that an associated PLMN can provide access to the second type of core network or that the associated PLMN can provide access to both the first type of core network and the second type of core network.

13. The device of claim 12, wherein the instructions being executable by the processor to cause the device to initiate further comprise:
  instructions being executable by the processor to cause the device to format an access stratum (AS) indication that indicates the first type of core network, and transmitting the AS indication to the base station.

14. The device of claim 11, wherein the instructions being executable by the processor to cause the device to receive further comprise:
  instructions being executable by the processor to cause the device to receive a second IE that indicates that the list of networks comprises a list of PLMN IDs that are capable of providing access to the second type of core network.

15. The device of claim 11, wherein the instructions being executable by the processor further to cause the device to:
  initiate a connection establishment to the second type of core network based at least in part on determining that each network of the list of networks is incapable of providing access to the first type of core network.

16. The device of claim 11, wherein the instructions being executable by the processor to cause the device to receive further comprises:
  instructions being executable by the processor to cause the device to receive the list of networks in a first IE that indicates one or more PLMNs that are capable of providing access only to the first type of core network.

17. A device for wireless communications, comprising:
a processor; and
a memory coupled with the processor, the memory embodying instructions, the instructions being executable by the processor to cause the device to:

receive, from a base station, one or more information elements (IEs) indicating a list of networks that are available via the base station, comprising:
  receiving the list of networks in a first IE that indicates one or more public land mobile networks (PLMNs) that are capable of providing access only to a first type of core network; and
  receiving a second IE that indicates one or more other PLMNs that are capable of providing access to the first type of core network or both the first type of core network and a second type of core network, wherein the first IE is recognizable by the first type of UE capable of accessing the first type of core network, and the second IE is recognizable by the first type of UE and a second type of UE that is incapable of accessing the first type of core network;
determine a type of core network associated with each network in the list of networks, based at least in part on whether each network served by the base station is capable of providing access to the first type of core network or to both the first type of core network and the second type of core network, and based at least in part on one or more of a per PLMN based tracking area code indication for each type of core network, an indication associated with a PLMN database, or, for each PLMN, a type of the list of networks that contains the PLMN; and
initiate a connection establishment to the first type of core network via a first network of the list of networks based at least in part on determining that the first network is capable of providing access to the first type of core network.

18. A device for wireless communications, comprising:
a processor; and
a memory coupled with the processor, the memory embodying instructions, the instructions being executable by the processor to cause the device to:
  receive, from a base station, one or more information elements (IEs) indicating a list of networks that are available via the base station, the one or more IEs comprising:
    a first IE that indicates that a first type of UE is not barred from accessing the base station, the first type of UE being capable of accessing a first type of core network; and
    a second IE recognizable by a second type of UE that indicates that UEs are barred from accessing the base station, the second type of UE being incapable of accessing the first type of core network and being incapable of recognizing the first IE;
  determine a type of core network associated with each network in the list of networks, based at least in part on whether each network served by the base station is capable of providing access to the first type of core network or to both the first type of core network and a second type of core network, and based at least in part on one or more of a per public land mobile network (PLMN) based tracking area code indication for each type of core network, an indication associated with a PLMN database, or, for each PLMN, a type of the list of networks that contains the PLMN; and
  initiate a connection establishment to the first type of core network via a first network of the list of networks based at least in part on determining that the first network is capable of providing access to the first type of core network.

19. A method for wireless communication, comprising:
transmitting to a user equipment (UE), by a base station, one or more system information blocks (SIBs) including one or more information elements (IEs) that indicate a list of networks that are available via the base station, wherein the one or more IEs are recognizable by a first type of UE that is capable of accessing a first type of core network;
providing, in the one or more system information blocks (SIBs), an indication of whether each of the networks in the list of networks is capable of providing access to at least one of a first type of core network or a second type of core network, wherein the type of core network identifies a radio access technology (RAT) of the core network, and wherein the type of core network is based at least in part on one or more of a per public land mobile network (PLMN) based tracking area code indication for each type of core network, an indication associated with a PLMN database, or, for each PLMN, a type of the list of networks that contains the PLMN; and
receiving a request from the UE to establish a connection with the first type of core network via one of the networks that is capable of providing access to the first type of core network.

20. The method of claim 19, wherein the list of networks comprises a list of PLMN IDs, and wherein the transmitting comprises:
  transmitting, for a plurality of PLMNs served by the base station, a per-PLMN IE that indicates that an associated PLMN can provide access to the second type of core network or that the associated PLMN can provide access to both the first type of core network and the second type of core network.

21. The method of claim 20, wherein the receiving comprises receiving an access stratum (AS) indication in a connection establishment request that indicates the first type of core network.

22. The method of claim 19, further comprising:
  transmitting a second IE that indicates that the list of networks comprises a list of PLMN IDs that are capable of providing access to the second type of core network.

23. The method of claim 19, wherein the list of networks comprises a list of PLMN IDs, and wherein the transmitting comprises:
  transmitting a PLMN list in the one or more IEs that indicates one or more PLMNs that are capable of providing access only to the first type of core network.

24. A method for wireless communication, comprising:
transmitting to a user equipment (UE), by a base station, one or more information elements (IEs) that indicate a list of networks that are available via the base station, wherein the one or more IEs are recognizable by a first type of UE that is capable of accessing a first type of core network, wherein the list of networks comprises a list of public land mobile network (PLMN) IDs, and wherein the transmitting comprises:
  transmitting a PLMN list in the one or more IEs that indicates one or more PLMNs that are capable of providing access only to the first type of core network; and
  transmitting a second IE that indicates one or more other PLMNs that are capable of providing access to the first type of core network or both the first type of core network and a second type of core network, wherein the second IE is recognizable by the first type of UE and by a second type of UE that is incapable of accessing the first type of core network, and wherein a type of core network is based at least in part on one or more of a per PLMN based tracking area code indication for each type of core network, an indication associated with a PLMN database, or, for each PLMN, a type of the list of networks that contains the PLMN;

providing an indication of whether each of the networks in the list of networks is capable of providing access to the first type of core network or both the first type of core network and a second type of core network; and receiving a request from the UE to establish a connection with the first type of core network via one of the networks that is capable of providing access to the first type of core network.

25. A method for wireless communication, comprising:

transmitting to a user equipment (UE), by a base station, one or more information elements (IEs) that indicate a list of networks that are available via the base station, wherein the one or more IEs are recognizable by a first type of UE that is capable of accessing a first type of core network, wherein the one or more IEs indicate that the first type of UE is not barred from accessing the base station and wherein the transmitting comprises:

transmitting a second IE recognizable by a second type of UE that indicates that UEs are barred from accessing the base station, the second type of UE being incapable of accessing the first type of core network, wherein a type of core network is based at least in part on one or more of a per public land mobile network (PLMN) based tracking area code indication for each type of core network, an indication associated with a PLMN database, or, for each PLMN, a type of the list of networks that contains the PLMN;

providing an indication of whether each of the networks in the list of networks is capable of providing access to the first type of core network or both the first type of core network and a second type of core network; and receiving a request from the UE to establish a connection with the first type of core network via one of the networks that is capable of providing access to the first type of core network.

26. The method of claim 25, wherein the transmitting further comprises:

transmitting, on a per-network basis, an indication that one or more of the networks served by the base station are capable of providing access to the first type of core network.

27. A device for wireless communications, comprising:

a processor; and a memory coupled with the processor, the memory embodying instructions, the instructions being executable by the processor to cause the device to:

transmit to a user equipment (UE), by a base station, one or more system information blocks (SIBs) including one or more information elements (IEs) that indicate a list of networks that are available via the base station, wherein the one or more IEs are recognizable by a first type of UE that is capable of accessing a first type of core network;

provide, in the one or more system information blocks (SIBs), an indication of whether each of the networks in the list of networks is capable of providing access to at least one of a first type of core network or a second type of core network, wherein the type of core network identifies a radio access technology (RAT) of the core network, wherein the type of core network is based at least in part on one or more of a per public land mobile network (PLMN) based tracking area code indication for each type of core network, an indication associated with a PLMN database, or, for each PLMN, a type of the list of networks that contains the PLMN; and receive a request from the UE to establish a connection with the first type of core network via one of the networks that is capable of providing access to the first type of core network.

28. The device of claim 18, wherein the first type of UE is configured to ignore the second IE.

29. The device of claim 18, wherein the instructions being executable by the processor to cause the device to receive further comprises:

instructions being executable by the processor to cause the device to receive an indication in the first IE, on a per-network basis, of one or more networks served by the base station that are capable of providing access to the first type of core network.

* * * * *